United States Patent
Swierk et al.

(10) Patent No.: US 11,310,464 B1
(45) Date of Patent: Apr. 19, 2022

(54) SYSTEM AND METHOD FOR SEVICEABILITY DURING EXECUTION OF A VIDEO CONFERENCING APPLICATION USING INTELLIGENT CONTEXTUAL SESSION MANAGEMENT

(71) Applicant: Dell Products, LP, Round Rock, TX (US)

(72) Inventors: Todd E. Swierk, Austin, TX (US); Vivek Viswanathan Iyer, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/156,618

(22) Filed: Jan. 24, 2021

(51) Int. Cl.
*H04N 7/15* (2006.01)
*G06T 5/00* (2006.01)
*H04N 7/14* (2006.01)
*G06T 5/10* (2006.01)
*G06N 3/08* (2006.01)

(52) U.S. Cl.
CPC .............. *H04N 7/152* (2013.01); *G06N 3/08* (2013.01); *G06T 5/002* (2013.01); *G06T 5/10* (2013.01); *H04N 7/142* (2013.01)

(58) Field of Classification Search
CPC . H04N 7/15; H04N 7/152; H04N 7/14; G06T 5/00; G06T 5/10; G06N 3/08
USPC .......................................... 348/14.01–14.16
See application file for complete search history.

(56) References Cited

U.S. PATENT DOCUMENTS

| | | | |
|---|---|---|---|
| 6,072,907 A | 6/2000 | Taylor |
| 10,499,069 B2 | 12/2019 | Wang |
| 10,516,890 B2 | 12/2019 | Wang |
| 10,623,756 B2 | 4/2020 | Wang |
| 10,681,361 B2 | 6/2020 | Wang |

(Continued)

FOREIGN PATENT DOCUMENTS

| | | |
|---|---|---|
| EP | 2611068 A1 | 7/2013 |
| EP | 3259918 B1 | 8/2020 |
| WO | 2009/019671 A1 | 2/2009 |

*Primary Examiner* — Melur Ramakrishnaiah
(74) *Attorney, Agent, or Firm* — Prol Intellectual Property Law, PLLC; H. Kenneth Prol

(57) ABSTRACT

An information handling system executing a multimedia multi-user collaboration application (MMCA) including a memory; a power management unit; a camera to capture video of a user participating in a video conference session; a processor configured to execute code instructions of a trained intelligent collaboration contextual session management system (ICCSMS) neural network to receive as input: computations from an execution of a blur AV detection processing instruction module by the processor descriptive of a blur in an image frame received at a multimedia framework pipeline and infrastructure platform (MFPIP); computations from an execution of a compression artifact AV detection processing instruction module by the processor descriptive of compression artifacts present in the image frame received at the MFPIP; and computations from an execution of a color vector AV detection processing instruction module by the processor descriptive of color vector artifacts present in the image frame received at the MFPIP; the trained ICCSMS to provide, as output, processing instructions to remediate the occurrence of blur, compression, and color vector artifacts in subsequently-received image frames.

20 Claims, 9 Drawing Sheets

(56) References Cited

U.S. PATENT DOCUMENTS

| | | | |
|---|---|---|---|
| 2008/0297589 A1* | 12/2008 | Kurtz | H04N 7/15 348/14.16 |
| 2011/0069138 A1* | 3/2011 | Ali | H04N 19/865 348/14.1 |
| 2013/0342638 A1* | 12/2013 | Sobti | G06F 1/1698 348/14.08 |
| 2017/0345130 A1 | 11/2017 | Wang | |
| 2017/0347061 A1 | 11/2017 | Wang | |
| 2017/0374374 A1 | 12/2017 | Wang | |
| 2018/0075581 A1* | 3/2018 | Shi | G06T 3/4053 |
| 2018/0124378 A1* | 5/2018 | Forutanpour | G06T 5/005 |
| 2018/0130178 A1 | 5/2018 | Wang | |
| 2018/0139458 A1 | 5/2018 | Wang | |
| 2018/0165523 A1* | 6/2018 | Regep | G06T 7/97 |
| 2019/0019020 A1* | 1/2019 | Flament | G06N 3/08 |
| 2020/0021815 A1* | 1/2020 | Topiwala | G06N 3/082 |
| 2020/0050923 A1* | 2/2020 | Patney | G06N 3/0454 |
| 2020/0184603 A1 | 6/2020 | Mukherjee | |
| 2020/0294317 A1* | 9/2020 | Segal | G06N 3/08 |
| 2020/0322536 A1 | 10/2020 | Johansen | |

* cited by examiner

SYSTEM AND METHOD FOR SEVICEABILITY DURING EXECUTION OF A VIDEO CONFERENCING APPLICATION USING INTELLIGENT CONTEXTUAL SESSION MANAGEMENT

FIELD OF THE DISCLOSURE

The present disclosure generally relates to multi-user collaboration applications such as videoconferencing applications. More specifically, the present disclosure relates to intelligently managing serviceability during media processing of video images based on image analysis presented within a current user session executed by the multi-user collaboration application.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
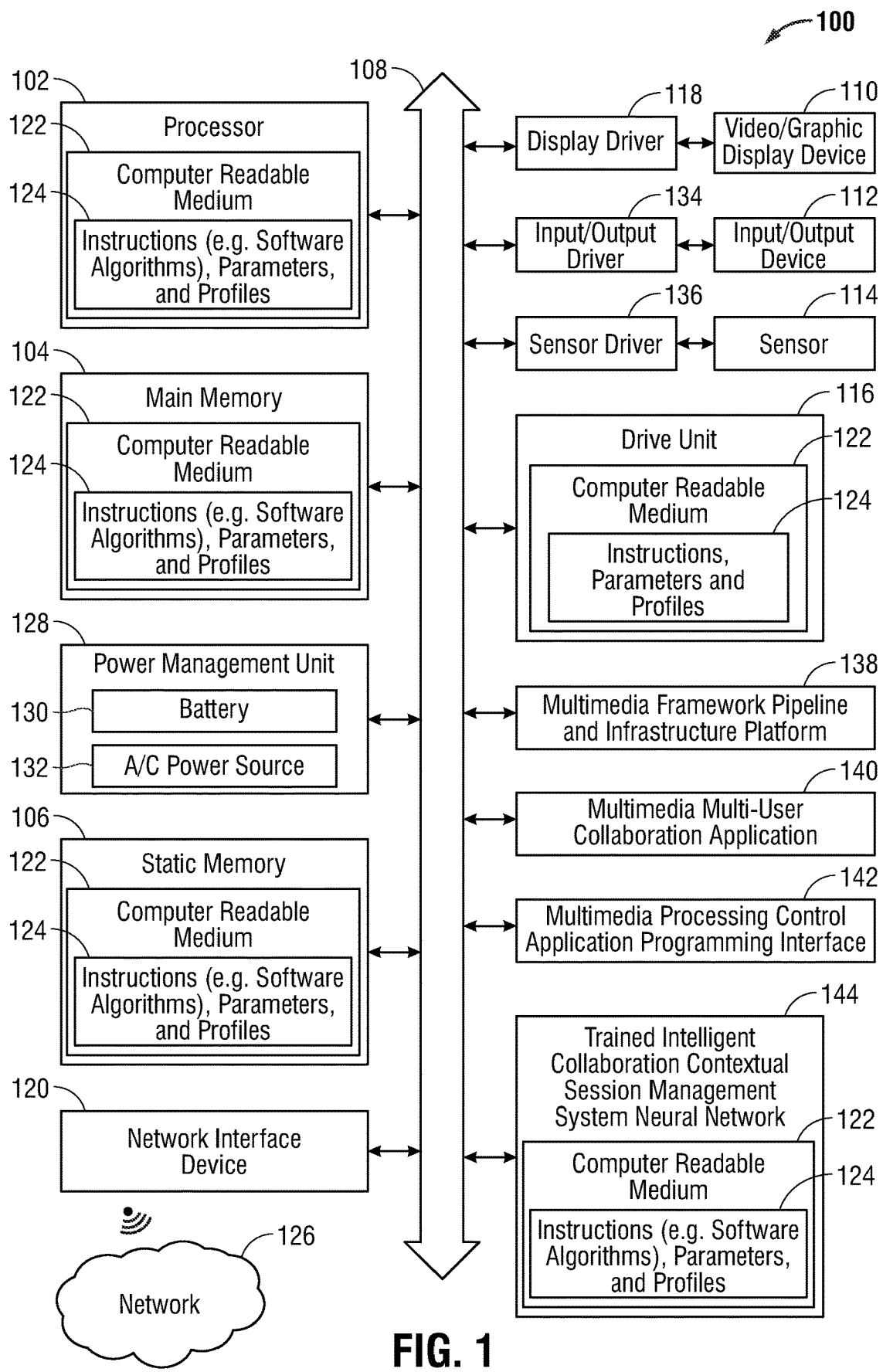
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As working remotely has gained in popularity, so too has the prevalence of multi-employee or multi-business video conferences. Many of these video conferences (also referred to as web-conferences, online meetings, tele-video conferences, or remote conferences) may include a large number of people, sometimes exceeding 50 or 100 participants. In many cases, only one or a handful of meeting participants are actively engaged in the meeting, as presenters, or as active participants in a discussion, for example. However, most existing multimedia multi-user collaboration applications (MMCAs) hosting such video conferences perform the same video processing methods on videos of each participant. Such processing may occur both at each individual participant's computing device, and at all other participant's computing devices, after the video of a single participant has been transmitted to the computing devices of all other participants. However, video captured at a user's information handling system or streamed from remote participant information handling systems may experience degradation of video quality due to a variety of factors. Degradation may be fleeting or an ongoing issue. A system, according to embodiments of the present disclosure may determine various types of degradation are occurring and determine, via a trained intelligent collaboration contextual session management system (ICCSMS) neural network, whether self-remediation is available or if a service ticket is needed for management by an information technology (IT) manager or the user.

Embodiments of the present disclosure provide for an executing a multimedia multi-user collaboration application (MMCA). The execution of the MMCA allows for the plurality of users to participate in a video conferencing session by presenting presentations, listening to the discussion, viewing the presentations, and providing oral and visual feedback to the other users. The information handling system may include a memory, a power management unit (PMU) to provide power to the information handling system, and a camera to capture video of the user of the information handling system participating in the video conferencing session.

In an embodiment, the processor of the information handling system includes a trained ICCSMS neural network to, upon execution by a processor, receive, as input, a number of computations describing blur artifacts, compression artifacts, or color vector artifacts found within a video frame. In an embodiment, the blur artifacts present within a video frame may be determined or calculated through the execution of a blur AV detection processing instruction module by the processor. The computed data resulting from this execution of the module may be presented, as input, to the trained ICCSMS neural network. In an embodiment, the compression artifacts present within a video frame may be determined or calculated through the execution of a compression artifact AV detection processing instruction module by the processor. The computed data resulting from this execution of the module may also be presented, as input, to the trained ICCSMS neural network. In an embodiment, the color vector artifacts present within a video frame may be determined or calculated through the execution of a color vector AV detection processing instruction module by the processor. The computed data resulting from this execution of the module may also be presented, as input, to the trained ICCSMS neural network.

In an embodiment, further data may be presented to the trained ICCSMS neural network as input. This additional data may include certain operation characteristics of the hardware, software, and firmware of the information handling system as well as characteristics associated with the operation of the network over which the information handling system receives and sends data packets. Because these hardware, software, and firmware characteristics may cause the audio and video characteristics of the videoconference, adjustments to the operations of this hardware, firmware, and software may increase the video and audio presented during the video conferencing session.

In an embodiment, the trained ICCSMS may provide, as output, processing instructions or operating adjustment instructions to remediate the occurrence of blur, compression, and color vector artifacts in currently received or subsequently-received image frames. These processing or adjustment instructions may include instructions that readjust processing resources where, for example, the processing resources of a main central processing unit (CPU) cannot encrypt, decrypt, or otherwise process the video frames in real-time. In this embodiment, the output from the trained ICCSMS neural network may generate an optimized offload instruction to cause that other processing devices such as a graphical processing unit (GPU), a vision processing unit (VPU), a gaussian neural accelerator (GNA) control logic or some combination of the same be used to help process the video frames. Other outputs from the trained ICCSMS neural network may include generated optimized AV acquisition settings for changes to the resolution or aspect ratio of video frames captured by the camera of the information handling system to be changed in order to reduce the amount of processing resources consumed or reduce the amount of data to be transmitted over the network. Other outputs from the ICCSMS are described herein and are contemplated to be initiated to correct for and prevent any blur, compression, and color vector artifacts. In an embodiment, the processing instructions to remediate the occurrence of blur, compression, and color vector artifacts in subsequently-received image frames include processing instructions to adjust an image resolution captured by the camera of the information handling system. In an embodiment, the processing instructions to remediate the occurrence of blur, compression, and color vector artifacts in subsequently-received image frames include optimized processing instructions to adjust encryption/decryption parameters used by an encryption/decryption processing module or compression/decompression processing module to encrypt/decrypt or compress the video frame.

In an embodiment, the information handling system may include a color sensor to detect color vector data in the video frame and provide the color vector data to the color vector AV detection processing instruction module to compute color vector artifacts present in the image frame received at the MFPIP. The color sensor may be in the form of executable code instructions that, when executed by a processor analyzes color vectors within a video frame and provides an analysis of the colors present in that image.

In an embodiment, the blur AV detection processing instruction module may include a fast Fourier transform. Upon execution of the fast Fourier transform executable code instructions, the AV detection processing instruction module may determine whether a threshold level of blur is present in a video frame.

In an embodiment, an AV processing instruction manager may be used to chain together the blur AV detection processing instruction module, the compression artifact AV detection processing instruction module, and the color vector AV detection processing instruction module to successively apply and reapply the blur AV detection processing instruction module, the compression artifact AV detection processing instruction module, and the color vector AV detection processing instruction module to the video frame. This may allow for the application and reapplication of the various AV detection processing instruction modules to better compute input data for consumption at the trained ICCSMS neural network.

In an embodiment, the trained ICCSMS neural network may be executed on a backend server remote from the information handling system. Similarly, in an embodiment, a host server may be implemented to host and coordinate user sessions of the MMCA. In an embodiment, the trained ICCSMS may also provide, as output, processing instructions to create a service ticket to be sent to an information technology (IT) coordinating server. In this embodiment, the processing instructions may be used to create a service ticket to be sent to the IT coordinating server when a threshold number of video conference sessions engaged in by the information handling system experience the occurrence of blur, compression, and color vector artifacts.

The information handling system, in an embodiment, may also include a multimedia framework pipeline and infrastructure platform (MFPIP). In an embodiment, the MFPIP may include a video processing engine to, upon execution by the processor, apply code set instructions of at least one AV processing instruction module to a video frame to perform the computations and provide input to the trained ICCSMS neural network as described herein. The MFPIP may receive outputs from the trained ICCSMS neural network to adjust image acquisition, AV processing module operations, or processor offloading to alternative processors or other processing resources.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

The information handling system 100 described with reference to FIG. 1 may represent a transmitting (e.g., AV media data source) information handling system or a receiving (e.g., AV media data sink) information handling system in various embodiments. In still other embodiments, information handling system 100 may operate as both a transmitting and a receiving information handling system, as may be the case for an information handling system transmitting video of one participant user while simultaneously executing code instructions for the MMCA 140 to display videos of other participants within a shared user video conferencing session. In yet another embodiment, the information handling system 100 may operate remotely from all transmitting or receiving information handling systems while executing code instructions of the MICA 140 to coordinate participation within a user session such as a MMCA control provider server. Additionally, some or all of the trained intelligent collaboration contextual session management system (ICCSMS) neural network 144 may operate on a server, blade, rack, or cloud-based network maintained and controlled by the manufacturer of several information handling systems, or managed by an employer or enterprise owner of several information handling systems. In such an embodiment, the information handling system 100 may operate within one of these servers, blades, racks, or across various nodes of a cloud-based network to monitor certain performance metrics at each of the plurality of such information handling systems, perform firmware and software updates, confirm security credentials and compliance, and manage user access across the plurality of information handling systems (e.g., as owned by an employer or enterprise corporation). In such an embodiment, each of the plurality of transmitting and receiving information handling systems participating within a user video conferencing session of the multimedia multi-user collaboration application 140 may incorporate an agent or API for the trained ICCSMS neural network 144.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices as well as various input/output (I/O) devices 112, such as a keyboard, a mouse, a video/graphic display 110, or any combination thereof. In an embodiment, the I/O devices 110 may each include an associated input/output driver 134 to be executed by the processor 102 in order to enable an operating system of the information handling system 100 and other computer programs to access hardware functions of the input/output devices 112. Input/output devices 112 also include a video camera or cameras, a microphone or microphones, and speaker or speakers that allow for audio and video to be obtained and presented to one or more users engaged in the video conferencing session initiated by the MMCA. Additionally, the input/output devices 112 may be operatively coupled to a streaming media device driver to gather the audio and video samples recorded at the microphone and video camera. The information handling system 100 may further include a display driver 118 to enable an operating system of the information handling system 100 and other computer programs to access the video/graphics display device 110. The information handling system 100 can also include one or more buses 108 operable to transmit communications between the various hardware components. Portions of an information handling system 100 may themselves be considered information handling systems 100 in an embodiment.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), graphical processing unit (GPU), vision processing unit (VPU), gaussian neural accelerator (GNA) control logic or some combination of the same. Any of the processing resources may operate to execute code that is either firmware or software code. Moreover, the information handling system 100 can include memory such as main memory 104, static memory 106, computer readable medium 122 storing instructions 124 of the multimedia framework pipeline and infrastructure platform 138 (MFPIP), multimedia multi-user collaboration application 140 (MMCA), multimedia processing control application programming interface 142 (MP-CAPI), trained ICCSMS neural network 144, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad, or gesture or touch screen input), and a keyboard, video cameras, microphones, or speakers. The information handling system 100 can also include a disk drive unit 116.

The network interface device 120 can provide connectivity to a network 126, e.g., a wide area network (WAN), a local area network (LAN), wireless local area network (WLAN), a wireless personal area network (WPAN), a wireless wide area network (WWAN), or other networks. Connectivity may be via wired or wireless connection. The network interface device 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one network interface device 120 may operate two or more wireless links.

The network interface device 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well as the NRFR1, NFRF2, bands, and other known bands. In an embodiment, the network interface device 120 with a wireless adapter may transceive within radio frequencies associated with the 5G New Radio (NR) Frequency Range 1 (FR1) or Frequency Range 2 (FR2), or those associated with 4G LTE and other standards predating the 5G communications standards now emerging. NRFR1 may include radio frequencies below 6 GHz. NRFR2 may include radio frequencies above 6 GHz, made available within the now emerging 5G communications standard. Communications within the WLAN or WWAN may be enabled through the use of either an evolved Node B (eNodeB) executing an evolved packet core of an existing LTE system, or a Next Generation Node B (gNodeB) executing the next generation packet core of the 5G cellular standard.

In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. For example, one or more audio/visual (AV) processing instruction modules may be code sets with instructions 124 for performing various processing tasks to remediate the occurrence of blur artifacts, compression artifacts, and color vector artifacts in subsequently-received image frames. In an embodiment, the AV processing instruction modules may also process received AV data during an MMCA video conferencing session for display or play to a user in some embodiments. Some AV processing instruction modules may also process acquired AV data at a user's information handling system via a camera or microphone for transmission during an MMCA video conferencing session in embodiments to other information handling systems video conference sessions. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions 124, parameters, and profiles or receives and executes instructions 124, parameters, and profiles responsive to a propagated signal, so that a device connected to a network 126 can communicate voice, video or data over the network 126. Further, the instructions 124 may be transmitted or received over the network 126 via the network interface device 120 or a wireless adapter, for example.

The information handling system 100 can include a set of instructions 124 that can be executed to cause the computer system to perform any one or more of the methods or computer-based functions disclosed herein. For example, instructions 124 may execute an ICCSMS 144, a MPCAPI 142, a MMCA 140, a MFPIP 138, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116, main memory 104, and static memory 106, may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 may also contain space for data storage. Further, the instructions 124 may embody one or more of the methods or logic as described herein. For example, instructions relating to the ICCSMS 144, MPCAPI 142, MMCA 140, MFPIP 138, software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the ICCSMS 144, MPCAPI 142, MMCA 140, MFPIP 138, may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The ICCSMS 144, MPCAPI 142, MMCA 140, and/or MFPIP 138, may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may further include a power management unit (PMU) 128 (a.k.a. a power supply unit (PSU)). The PMU 128 may manage the power provided to the components of the information handling system 100 such as the processor 102, a cooling system such as a bank of fans, one or more drive units 116, a graphical processing unit (GPU), the video/graphic display device 110, and other components that may require power when a power button has been actuated by a user. In an embodiment, the PMU 128 may be electrically coupled to the bus 108 to provide this power. The PMU 128 may regulate power from a power source such as a battery 130 or A/C power adapter 132. In an embodiment, the battery 130 may be charged via the A/C power adapter 132 and provide power the to the components of the information handling system 100 when A/C power from the A/C power adapter 132 is removed.

The information handling system 100 may also include a sensor 114 or a plurality of sensors 114 that may be operably connected to the bus 108. The sensor 114 may be associated with computer readable medium 122 that may also contain space for data storage in order to store, at least temporarily, data descriptive of the characteristics of a video frame of a during a video conference session executed by a multimedia multi-user collaboration application or characteristics of an environment the user is present within near the information handling system. The sensors 114 may be operatively coupled to a sensor driver 136 to be executed by the processor 102 in order to enable an operating system of the information handling system 100 and other computer programs to access hardware functions of the input/output devices 112.

The sensors 114 may, according to the embodiments of the present specification, perform tasks related to detecting a blur, color vector, or compression artifact within a video frame. As described herein, the MFPIP 138 may receive video frames from an AV data stream originating at the information handling system 100 or received at the information handling system from a source information handling system operatively coupled to the information handling system 100 over a network 126. These video frames may include blur, color vector, or compression artifacts that may be detected by these sensors 114. For example, a color sensor may be used to detect the color vectors within the image frame. In this embodiment, the color sensor may be computer executable instructions that, when executed by the processor 102, can evaluate the color vectors within the video frames and provide color vector data to, for example, a color vector AV detection processing instruction module. In the embodiments herein, the sensors 114 may be hardware, firmware, software, or a combination thereof that provides data descriptive of the blur, color vector, or compression artifacts within a video frame.

The trained ICCSMS neural network 144 in an embodiment may be trained and operate as a neural network to provide, as output, processing instructions to remediate the occurrence of blur, compression, and color vector artifacts in subsequently-received image frames. In an embodiment, the trained ICCSMS neural network 144 may be trained, in an example, through a number of computations resulting from the execution of one or more AV detection processing instruction module by the processor 102. For example, the processor 102 may execute a blur AV detection processing instruction module to compute if and to what extent a blur within a video frame received at the MFPIP 138 exists. The data from this computation may be used as input to train the trained ICCSMS neural network 144. In another example, the processor 102 may execute a compression artifact AV detection processing instruction module to compute if and to what extent compression artifacts exists within the video frames received at the MFPIP 138. In yet another example, the processor 102 may execute a color vector AV detection processing instruction module to compute if and to what extent color vector artifacts exist within the video frames color vector artifacts exist within the video frames received at the MFPIP 138.

Other data may be used as input to the trained ICCSMS neural network 144 as well. Among these other types of data include processing resource usages within the information handling system 100, network bandwidth available to transmit the AV data during the video conferencing session, camera resolution or other camera image acquisition settings, and encoding/decoding processing, among other operation characteristics of the information handling system. One or more AV detection processing instruction modules may be executed to compute this data as well for input to the trained ICCSMS neural network 144.

In an embodiment, the video frames received at the MFPIP 138 during a video conferencing session may be used, in real-time to train the ICCSMS neural network 144. Once trained, the trained ICCSMS neural network 144 may then proceed to output the processing instructions to remediate the occurrence of blur, compression, and color vector artifacts in subsequently-received image frames. In an alternative embodiment, the trained ICCSMS neural network 144 may be trained prior to execution of the MMCA and engagement with video conferencing session.

The ICCSMS 144 may train and execute a trained ICCSMS neural network as part of the ICCSMS in an embodiment. The ICCSMS 144 may include code instructions 124 for training the neural network. In an embodiment in which the ICCSMS 144 operates to train a neural network, the information handling system 100 may represent the transmitting information handling system, the receiving information handling system, both of these, or an information handling system located remotely from both the transmitting and receiving information handling systems. The trained ICCSMS neural network 144 of the ICCSMS resulting from training a neural network in each of these embodiments may gather various input values as described from a plurality of information handling systems executing the MMCA 140 over time in order to provide the optimal output processing instructions to remediate the occurrence of blur, compression, and color vector artifacts in subsequently-received image frames.

The information handling system 100 may further include an MMCA 140. The MMCA 140 may be any application that, when executed by the processor 102, initiate a video conference session between a plurality of users such as between the user of the information handling system 100 and another remote user of another information handling system. MMCA 140 may utilize an MMCA central facility server to engage in the video conference. With the MFPIP 138 and MPCAPI 142 and per the output from the trained ICCSMS neural network 144, the MMCA 140 may cause video frames to be transmitted to the MFPIP 138 for processing, reprocessing, encoding, decoding, capture, and display (e.g., via bus 108) and present each video frame to the user at the video/graphic display device 110. Examples of a MMCA 140 may include Zoom® developed by Zoom Video Communications, Skype® developed by Skype Technologies of Microsoft, Microsoft Teams® by Microsoft, WebEx® developed by Cisco, GoToMeeting® developed by LogMeIn, among others.

The information handling system 100 may also include a MFPIP 138. The MFPIP 138 may be any video processing system of the information handling system 100 that, with the processor 102, executes AV detection processing instruction modules to detect blur, color vector, or compression artifacts within each of the video frames created as the video camera (e.g., webcam). In an embodiment, the MFPIP 138 receives a stream of video frames and, via execution of these AV detection processing instruction modules, provides the data computed to the trained ICCSMS neural network 144.

In an embodiment, the information handling system 100 includes a multimedia processing control application programming interface (MPCAPI) 142. The MPCAPI 142 in an embodiment may operate to facilitate communication between various applications, controllers, and drivers of the information handling system 100 in an embodiment. For example, the MPCAPI 142 may interface between the MFPIP 138 and the sensors 114 such as the color vector sensor, fast Fourier transform. The MPCAPI 142 may, during operation of the information handling system 100, receive the individual video frames and direct the processor to execute the AV detection processing instruction modules to be executed to provide input data to the trained ICCSMS neural network 144. In an embodiment, the MPCAPI 142 may conduct an offloading process where the MPCAPI 142 has received, for example, optimized offloading processing instructions as output from the trained ICCSMS neural network 144 directing the offloading of processing from the processor 102 to another processing device such as a VPU, GPU, GNA, among others. For example, instead of using the processing resources associated with the processor 102, the MPCAPI 142 may, per the optimized processing offload instructions, direct a graphical processing unit (GPU), vision processing unit (VPU), gaussian neural accelerator (GNA) control logic or some combination of the same to supply additional processing resources to, for example, increase the encoding/decoding rate of the image frames. This may allow for the processor 102 to help decrease the artifacts present within a video frame processed for display at a user's information handling system during the video conference session executed by the MMCA 140.

In an embodiment, the MFPIP 138, MMCA 140, MPCAPI 142, and ICCSMS 144 may communicate with the main memory 104, the processor 102, the video/graphic display device 110, a keyboard, and the network interface device 120 via bus 108, and several forms of communication may be used, including ACPI, SMBus, a 24 MHZ BFSK-coded transmission channel, or shared memory. Driver software, firmware, controllers and the like may communicate with applications on the information handling system 100.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
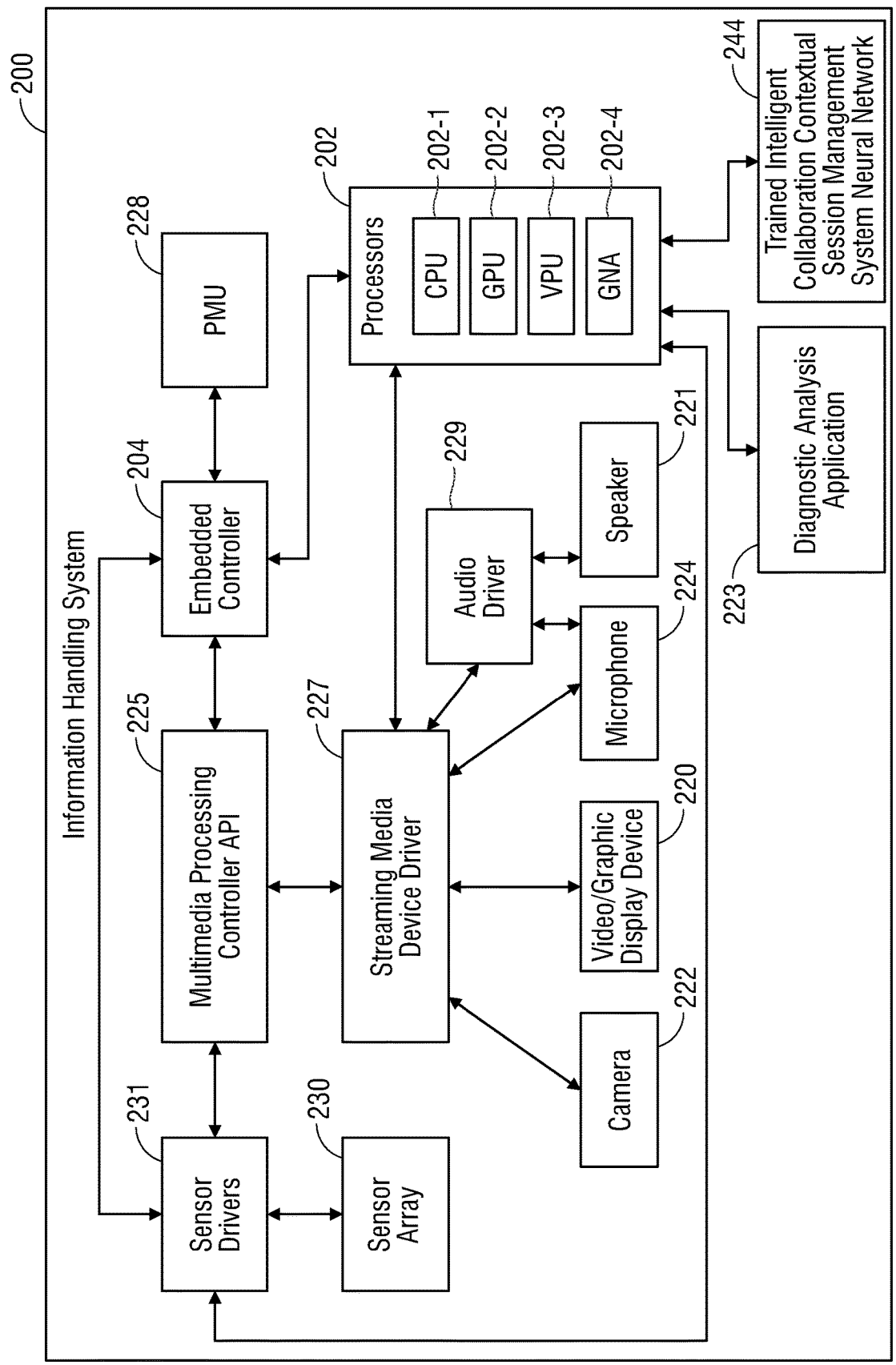
FIG. 2 is a block diagram illustrating various drivers and processors in communication with a plurality of peripheral devices of an information handling system according to an embodiment of the present disclosure.

FIG. 2 is a block diagram illustrating various drivers and processors in communication with a plurality of peripheral devices of an information handling system according to an embodiment of the present disclosure. FIG. 2 shows the operative couplings of a number of devices and processes present and executed within the information handling system 200 during operation of the information handling system 200. During operation, the information handling system 200 may be powered on via use of an on switch on the PMU 228. The PMU 228 may power on an embedded controller 204 that, in an embodiment, executes a basic input/output system (BIOS). The BIOS may also, in an embodiment, execute an operating system (OS).

As described herein, the trained ICCSMS neural network 244 may optimize various settings for peripheral devices used in the capture, compression, encoding, and decoding of media samples received at the MFPIP and played during user video conferencing sessions for a MMCA. In the context of the present specification the MFPIP may receive AV media including video frames acquired with a video camera 222 and microphone 224 of the information handling system. Additionally, because the information handling system is operatively coupled to other source information handling systems during the video conferencing, video frames may be received at the MFPIP 338 form these other source information handling systems and played via a video/graphic display device 220 and speakers 221.

In an embodiment, the trained ICCSMS neural network 244 may modify media capture settings, AV processing instruction modules applied to such captured media samples (e.g., video frames), or change the type of processes used to perform such AV processing instruction modules in order to optimize performance of the MMCA on one or more information handling systems in an embodiment. As described herein, certain artifacts may be seen in the video and audio during the streaming process of the video conferencing session. These artifacts are an undesirable degradation of quality of the streaming video. For example, some video received at the MFPIP via the streaming media device driver 227 and shown to the user on a video/graphic display device 220 may include blur artifacts that cause some or all of the image presented to the user to appear blurred. Still further, compression artifacts may be seen as well that cause the image to appear blocky due to certain image compression and decompression processes. Still further, the video received at the MFPIP via the streaming media device driver 227 and shown to the user on a video/graphic display device may include certain color vector artifacts that are seen as color distortions to the viewer. The trained ICCSMS neural network 244 may be trained to adjust the hardware operation parameters and software execution parameters of the information handling system 200 to correct for the occurrence of these artifacts by providing processing instructions to remediate such hardware and software operations.

A trained ICCSMS neural network 244 in an embodiment may make such optimization determinations for each individual information handling system (e.g., 200) separately. Such a determination may be made based upon a plurality of inputs describing hardware and software capabilities and performance metrics of the information handling system at issue, default media capture instructions and default AV processing instructions generated by the multimedia multi-user collaboration application, various sensor readings taken at the information handling system, and meeting metrics describing user participation and performance of the multi-media multi-user collaboration application.

Other neural network input values at the trained ICCSMS neural network 244 may be gathered from the execution of, for example, a blur AV detection processing instruction module. The execution of the blur AV detection processing instruction module by a processor 202 causes a computation to be executed to determine whether a blur in the image frames has been detected. For example, the blur AV detection processing instruction module may include computer executable instructions that applies a fast Fourier transform (FFT) to the data of the image frame to determine whether the image is blurred. When the execution of the FFT indicates that a blur does exist, additional data may be received indicating whether a threshold level of blur has been reached. In another example embodiment, the Laplacian operator may be used by selecting a single channel within the image frame and convolving it with the Laplacian kernel.

A variance (e.g., a standard deviation squared) of the response may be calculated. Where the variance falls below a threshold, then the image is considered blurry. Where the variance does not fall below that threshold, then the image is not considered blurry. The threshold may be set after incorporating a number of images as a dataset into a neural network such as the ICCSMS neural network in order to train the ICCSMS neural network into finding that threshold. In this embodiment, if the threshold has been reached, this data may be provided to the trained ICCSMS neural network 144 as input. The trained ICCSMS neural network 144 may receive this input and determine, based on the trained neural network thereof, which, if any, self-remediation processes may be conducted to remediate this blurring artifact. The self-remediation processes may be defined by specific computer instructions from the trained ICCSMS neural network 144 that, for example, adjusts the video capture characteristics of a camera used to provide the streaming video data to the MFPIP. Other self-remediation processes may include adjusting AV processing instruction modules such as encoding or decoding algorithms used to compress and decompress, respectively, the video frames during the streaming video conference session. Other self-remediation processing instructions may be provided by the trained ICCSMS neural network 144 in order to correct the blurring artifacts in the video frames and the present specification contemplates these other self-remediation processes.

In addition to calculating whether a video frame is blurred, the present specification contemplates that other artifacts may exist within the individual video frames. Among these other artifacts is speckle noise resulting from CMOS degradations in the video camera. The speckle detection may be carried out by executing a speckle AV detection processing instruction module that causes a computation to be executed to determine whether speckles in the image frames has been detected. Such an evaluation may include, among other processes, executing a gray level analysis method that may include analyses such as he speckle index (SI), peak signal-to-noise ratio (PSNR), equivalent number of looks (ENL), and standard deviation (SD). Were speckles are found to exist, this data may be provided to the trained ICCSMS neural network as additional input. As potential output, the trained ICCSMS neural network may indicate that certain temperature compensations at the CMOS be initiated or cross-talk contrast compensation be executed on the data or other self-remediation techniques that adjust the hardware or the image frame data to increase the visual composition of the video frame.

In an embodiment, in addition to the self-remediation processing instructions received from the trained ICCSMS neural network 244, the trained ICCSMS neural network 244 may further send instructions to create a service ticket to be sent to the IT coordinating server. The service ticket may be descriptive of an identified issue including assessment of potential causes or how an IT coordinator can change or repair hardware within the information handling system 200. The service ticket may also provide data that may be used by the IT coordinating server to direct certain other source information handling systems engaged in the video conferencing session to also adjust the execution of hardware and software at those source information handling systems. In some embodiments, the output from the trained ICCSMS neural network 144 may, therefore, indicate that the execution of hardware and software at the information handling system 200 is not the cause of the inclusion of the blur, color vector, or compression artifacts in the video frames and instead it is a result of the hardware or software operated and executed by the network or the source information handling systems. The IT coordinating server may cause these notices to those source information handling systems in order to correct those video frames received at the information handling system 200 over the network.

In an embodiment, neural network input values at the trained ICCSMS neural network 244 may be gathered from the execution of, for example, a color vector AV detection processing instruction module. The execution of the color vector AV detection processing instruction module by a processor 202 causes a computation to be executed to determine whether color vector artifacts within the image frames has been detected. For example, the color vector AV detection processing instruction module may include computer executable instructions that applies a color sensor or algorithm to the data of the image frame to determine whether the image includes color vector artifacts. When the execution of the color sensor indicates that color vector artifacts do exist, additional data may be received indicating whether a threshold level of color vector artifacts has been reached. In this embodiment, if the threshold has been reached, this data may be provided to the trained ICCSMS neural network 144 as input. The trained ICCSMS neural network 144 may receive this input and determine, based on the trained neural network thereof, which, if any, self-remediation processes may be conducted to remediate this blurring artifact. The self-remediation processes may be defined by specific computer instructions from the trained ICCSMS neural network 144 that, for example, adjusts the video capture characteristics of a camera used to provide the streaming video data to the MFPIP. Other self-remediation processes may include adjusting AV processing instruction modules such as color shift processing module to color shift display colors in some or all of the video images, or encoding or decoding algorithms (e.g., lossy compression algorithms) used to compress and decompress, respectively, the video frames during the streaming video conference session. Other self-remediation processing instructions may be provided by the trained ICCSMS neural network 144 in order to correct the color vector artifacts in the video frames and the present specification contemplates these other self-remediation processes.

In an embodiment, neural network input values at the trained ICCSMS neural network 244 may be gathered from the execution of, for example, a compression artifact AV detection processing instruction module. The execution of the compression artifact AV detection processing instruction module by a processor 202 causes a computation to be executed to determine whether compression artifacts within the image frames has been detected. For example, the compression artifact AV detection processing instruction module may include computer executable instructions that detects "blockiness" in the data of the image indicative of improper compression algorithms or decompression algorithms being used to compress or decompress the image, for example. When the execution of the compression artifact AV detection processing instruction module indicates that compression artifacts do exist, additional data may be received indicating whether a threshold level of compression artifacts has been reached. In this embodiment, if the threshold has been reached, this data may be provided to the trained ICCSMS neural network 144 as input. The trained ICCSMS neural network 144 may receive this input and determine, based on the trained neural network thereof, which, if any, self-remediation processes may be conducted to remediate this compression artifact. The self-remediation processes may be defined by specific optimized instructions output from the trained ICCSMS neural network 144 that, for example, adjusts the video capture characteristics of a camera used to provide the streaming video data to the MFPIP, or an optimized AV processing instruction to adjust compression algorithms used to compress the data, and decompression algorithms used to decompress the data. Other self-remediation processes may include trained neural network output to optimize AV processing instruction adjustments to adjust AV processing instruction modules for these encoding or decoding algorithms (e.g., direct cosine transforms) used to compress and decompress, respectively, the video frames during the streaming video conference session. Other self-remediation processing instructions may be provided by the trained ICCSMS neural network 144 in order to correct the compression artifacts in the video frames and the present specification contemplates these other self-remediation processes.

In an embodiment, the trained ICCSMS neural network 244 may be integrated, in whole or in part, in some embodiments within an information handling system performance optimizer application located remotely from the information handling system 200. In such an embodiment, the information handling system performance optimizer application may operate to manage security credentials, connectivity credentials, performance optimization, software updates, and other various routine computing maintenance tasks for a plurality of information handling systems (e.g., including 200) owned by an enterprise business or produced by a single manufacturer. The Dell® Optimizer® software application is one example of such an information handling system performance optimizer application. The information handling system performance optimizer application in such an embodiment may communicate with the embedded controller 204 to receive high-level hardware performance metrics from each of the plurality of information handling systems (e.g., including 200) it manages during routine out-of-band communications between the information handling system performance optimizer application and all managed information handling systems. Such out-of-band communications with the embedded controller 204 in an embodiment may be used to check security credentials or performance statistics for the information handling systems (e.g., 200), or to push software or firmware updates to the information handling systems, for example. During such routine maintenance, the information handling system performance optimizer application may accumulate, sort, and analyze all performance metrics received from all managed information handling systems (e.g., 200). Out-of-band communications initiated in such a way between the embedded controller 204 and the information handling system performance optimizer application may be via a wireless network such as Wi-Fi or cellular, or via wired connection. Such out-of-band communications operate without need for Operating System intervention or function and may operate behind the scenes to ensure optimized function for managed information handling systems.

As another example of gathering inputs for the trained ICCSMS neural network 244, software performance metrics may be generated at a diagnostic analysis application 223, based at least in part on communication between the diagnostic analysis application 223 and the processor 202. Such a diagnostic analysis application 223 may operate to gather metrics describing processor 202 usage or load, as well as a breakdown of the processor 202 usage attributable to each of a plurality of applications (e.g., including a multimedia multi-user collaboration application) running via the operating system of the information handling system 200. In some embodiments, the diagnostic analysis application 223 may provide similar metrics for other types of processors for the information handling system, including, for example, a graphics processing unit (GPU) 202-2, vision processing unit (VPU) 202-3, gaussian neural accelerator (GNA) 202-4, or other central processing units (CPU) 202-1 available to the information handling system. One example of such a diagnostic analysis application 223 in an embodiment may include the Microsoft® Diagnostic Data Viewer® software application. In an embodiment, these software performance metrics may be generated at the diagnostic analysis application 223 and transmitted to the trained ICCSMS neural network 244 via the multimedia processing controller API 225.

FIG. 2 further shows that the adjustments to the visual composition of the video frames according to the output of the trained ICCSMS neural network 244 may be imposed on a number of sensors such as a camera 222 and other sensors or the sensor array 230. In an embodiment, the camera 222 may acquire video frames and provide those frames to the streaming media device driver 227. The MFPIP may then compute the blur, color vector, and compression artifacts, if any, and provide that data to the trained ICCSMS neural network 244. In this embodiment, the output of the trained ICCSMS neural network 244 may include optimized AV processing instruction adjustments that adjust a resolution of the camera, aspect ratio of the camera, focus of the camera, among other hardware and software characteristics of the camera.

During the operation of the information handling system 200, drivers may be executed by the processor 202 to enable an OS of the information handling system 200 and other computer programs to access hardware functions of the input/output devices, sensors of the sensor array 230, and the camera 222, among others. These drivers working through a streaming media device driver 227 may help to facilitate the transmission of data from the individual sensors to the processor 202 or other processing device responsible for adjusting the visual composition of the video frames as described herein.

It is contemplated that the information handling system 200 may include a plurality of cameras 222 (e.g., one camera for each of a plurality of videoconferencing displays oriented at different angles to a user), a plurality of video/graphic displays (e.g., 220), and a plurality of microphones 224. The streaming media driver 225 in an embodiment may be capable of gathering the default or current media capture settings pursuant to which the camera 222 or microphone 224 are capturing images and audio, respectively. The streaming media driver 225 may also gather audio samples recorded at the microphone 224 as another input into the trained ICCSMS neural network 244. For example, such audio samples may be used in some embodiments in order to determine the frequency with which the user of the information handling system 200 is talking during a user session of the MMCA. Such a frequency may be input into the trained ICCSMS neural network 244 in embodiments to gauge user participation in the current user session, for example.

In some embodiments, default media capture instructions may be stored at the streaming media driver 227, which may operate to direct operation of the camera 222 or microphone 224. As described in greater detail with respect to FIG. 5, these default media capture instructions may be transmitted from the streaming media driver 225 to the trained ICCSMS neural network 244 via multimedia processing controller API 276.

Upon determination of optimized media capture instructions, offload instructions, or A/V processing instruction adjustments via the trained ICCSMS neural network 244, certain processing instructions used to remediate the occurrence of blur, compression, and color vector artifacts in the image frames may be transmitted to various components of the information handling system 200. For example, as described in greater detail with respect to FIG. 5, the trained ICCSMS neural network 244 may transmit the processing instructions generated as an output of the trained ICCSMS neural network 244 to a multimedia processing control API 276. Such a multimedia processing control API 276 in an embodiment may transmit the processing instructions to the streaming media driver 227 in an embodiment.

The streaming media driver 227 in an embodiment may direct the operation of the camera 222 and the microphone 224 such that media (e.g., images, video samples, audio samples) is captured according to the processing instructions to be used to remediate the occurrence of blur, compression, and color vector artifacts in subsequently-received image frames. For example, the streaming media driver 227 in an embodiment may direct the camera 222 to capture images and generate video samples having the frames per second, zoom settings, pan settings, focus settings, aspect ratio settings, or number of key frames defined by the processing instructions to remediate the occurrence of blur, compression, and color vector artifacts such as by lowering the data level of the captured video images and reducing computational load on processing those captured images. As another example, the streaming media driver 227 in an embodiment may direct the microphone 224 to capture and generate audio samples having the bitrate defined by the processing instructions. In such a way, the trained ICCSMS neural network 244 in an embodiment may optimize the capture of media samples to optimize performance of the MMCA.

Figure 3:
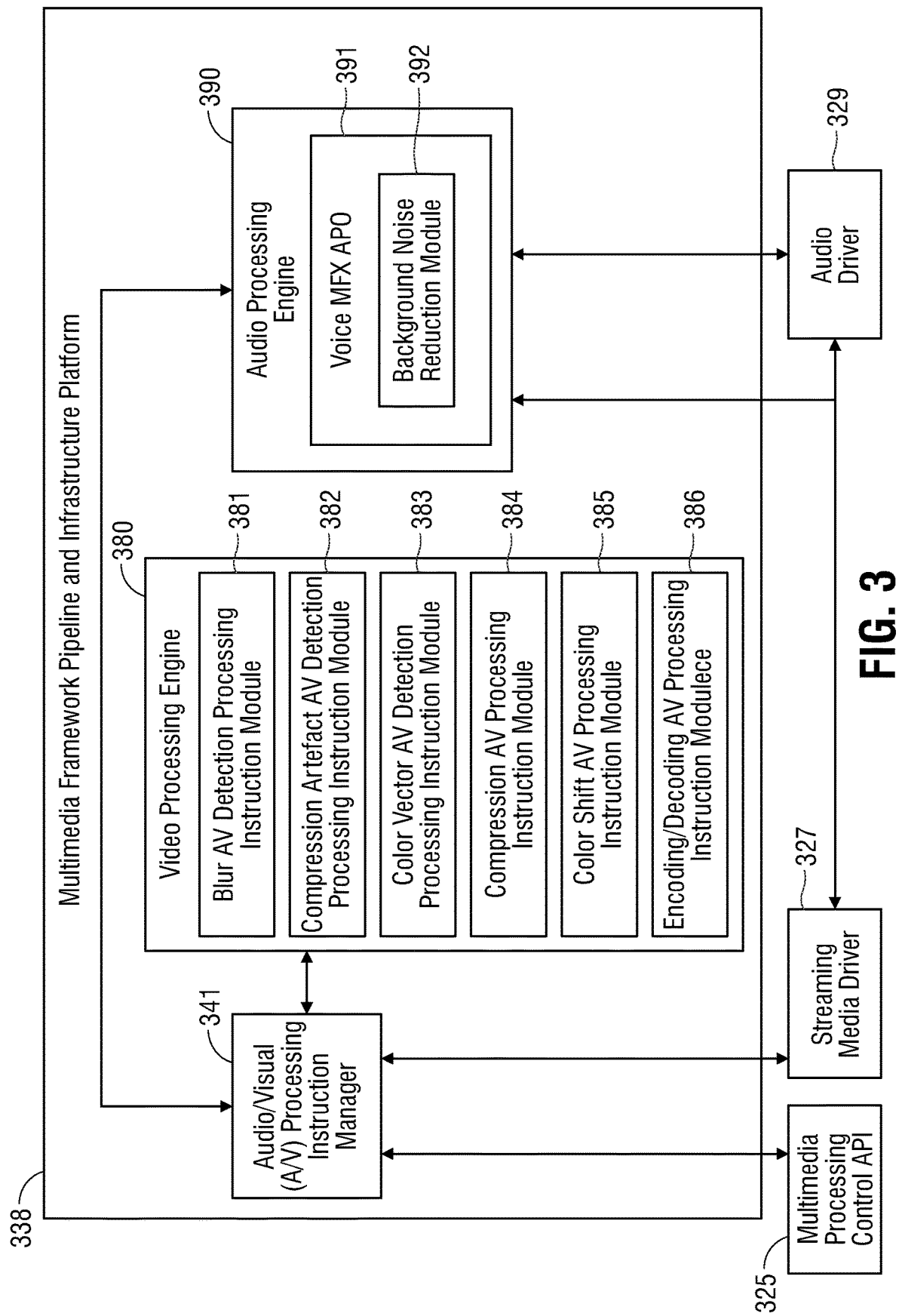
FIG. 3 is a block diagram illustrating a multimedia framework pipeline and infrastructure platform of an information handling system according to an embodiment of the present disclosure.

FIG. 3 is a block diagram illustrating a multimedia framework pipeline and infrastructure platform (MFPIP) 338 of an information handling system according to an embodiment of the present disclosure. The MFPIP 338, in the present embodiment, may form part of the information handling system 200. In an embodiment, some or all of the MFPIP 338 may be remote from the information handling system 200 as part of a distributed peer computer system that provides processing of the video frames of the video conference session remotely for a thin-client-type information handling system. In an alternative embodiment, the MFPIP 338 may reside on an information handling system similar to that described in connection with FIG. 1.

The MFPIP 338 may interface with a number of drivers via streaming media driver 327 of the information handling system as described herein in order to enable an operating system of the information handling system and other computer programs to access the devices used during the execution of the MMCA and other applications by the processor of the information handling system. The streaming media driver 327 may be a driver that, when executed by the processor, enables the operating system of the information handling system and other computer programs to distribute the video frames, as adjusted by operation of the MFPIP 338 as described herein. This data stream provided by the streaming media driver 327 may be sent across a network via, for example, a network interface device of the information handling system as described herein. The streaming media driver 327 in such an embodiment may receive video or audio samples captured by peripheral cameras or microphones in communication therewith, according to default or optimized media capture instructions, as described with reference to FIG. 2. In another embodiment, the audio driver 329 may receive audio samples captured by a microphone in communication therewith, according to such received media capture instructions. In such an embodiment, the audio driver 329 may operate as a mini-driver or child device to the parent device streaming media driver 327. The streaming media driver 327 may be in communication with the AV processing instruction manager 341 via one or more ports (e.g., as described in greater detail with respect to the device proxy of FIG. 4) such that video or audio samples received by the streaming media driver 327 may be transmitted to the AV processing instruction manager 341 in an embodiment. The audio driver 329 may be in communication with the AV processing instruction manager 341 such that audio samples received by the audio driver 329 may be transmitted to the AV processing instruction manager 341 (e.g., via the audio processing engine 390, or via the streaming media driver 327) in an embodiment. In such a way, the AV processing instruction manager 341 may direct retrieval of a video sample captured at a camera operably connected to information handling system and retrieval of an audio sample captured at a microphone operably connected to information handling system.

The audio driver 329 may interface with the operating system and be executed by the processor in order to drive, for example, a specific audio device such as a microphone and an audio card. The audio driver 329 may, in the embodiments herein, interface with an audio processing engine 390 that includes a voice mode effects audio processing object (MFX APO) 391. The driver may allow the MFX APO 391 to interface with the operating system in order to provide audio during the video conference session executed on the MMCA 140. In an embodiment, the MFX APO 391 provides software based digital signal processing for the video conference session. Examples of a MFX APO 391 include graphic equalizers, reverb, tremolo, Acoustic Echo Cancellation (AEC) and Automatic Gain Control (AGC). In an embodiment, the MFX APO 391 may be COM-based, real-time, in-process objects. During execution of the MFX APO 391, a background noise reduction module 392 or any other audio-based AV processing instruction module may be executed to adjust the audio output during the video conference session.

The MFPIP 338 may include a driver stack working with the streaming media driver 327 that operates other drivers such as those associated with peripheral devices of the information handling system. For example, and in the embodiments here, the peripheral devices may include a camera that captures video images and streams those images to the MFPIP as described herein. The driver stack working with the streaming media driver 327 may therefore be a combination of drivers that plug into each other with each of the drivers adding to a chain of drivers that may be executed in serial by the processor. For example, the driver associated with the video camera of the information handling system may be executed prior to any other devices or sensors so that a video frame may first be obtained prior to the data from the sensors being used to adjust the visual composition of the video frame via more AV processing instruction modules to post-process the captured video or audio data.

The MFPIP 338 may also include an AV processing instruction manager 341. The AV processing instruction manager 341 may be any processor that coordinates operation of the AV processing with the trained ICCSMS neural network as described herein and cause one or more AV processing instruction modules to be used to visually transform the one or more video frames during the execution of the video conference session. The AV processing instruction manager 341 may interface with a video processing engine 380 to cause one or more of the AV processing instruction modules 381-386 including the AV detection processing instruction modules (e.g., 381-383) to be executed so as detect visual operations including artifacts occurring in the video frames or to apply the appropriate visual changes to each video frame according to the optimized settings determined via the trained ICCSMS neural network.

As described, the AV processing instruction manager 341 may send input from one or more sensors and from the AV detection processing instruction modules (381-383) to the trained ICCSMS neural network and provide, as output, AV processing instruction adjustments, such as optimized acquisition setting instruction adjustments or optimized processor offload instruction adjustments, to remediate the occurrence of blur, compression, and color vector artifacts in subsequently-received image frames. In this embodiment, the AV processing instruction manager 341 may cause the video processing engine 380 to execute one or more of a blur AV detection processing instruction module 381, a compression artifact AV detection processing instruction module 382, a color vector AV detection processing instruction module 383, a processing resource AV detection processing instruction module 384, a network bandwidth AV detection processing instruction module 385, a camera resolution AV detection processing instruction module 386, and an encoding/decoding AV detection processing instruction module 387, among other AV detection processing instruction modules. During operation of the MFPIP 338, the video frames received at the MFPIP 338 are evaluated using these AV detection processing instruction modules (381-383). For example, the execution of the blur AV detection processing instruction module 381 may cause the MFPIP 338 to compute a level of blur within any video frame presented at the MFPIP 338. In an embodiment, the Laplacian operator may be used by selecting a single channel within the image frame and convolving it with the Laplacian kernel.

A variance (e.g., a standard deviation squared) of the response may be calculated. Where the variance falls below a threshold, then the image is considered blurry. Where the variance does not fall below that threshold, then the image is not considered blurry. The threshold may be set after incorporating a number of images as a dataset into a neural network such as the ICCSMS neural network in order to train the ICCSMS neural network into finding that threshold. In this embodiment, if a level of blur is detected, such data may be presented to the trained ICCSMS neural network as input along with any other types of input. In an embodiment, if the threshold level of blur is detected per the operations of the Laplacian operator, for example, then the data is provided to the trained ICCSMS neural network as input. Where the threshold level of blur is not met, no data descriptive of the blur is sent to the trained ICCSMS neural network. The blur AV detection processing instruction module 381 may be, in an embodiment, computer executable instructions that, when executed by a processor (CPU, GPU, VPU, GNA) of the information handling system, applies a fast Fourier transform (FFT) to each video frame received at the MFPIP 338 in order to calculate the amount of blur present in the video frame. As output, the trained ICCSMS neural network may present optimized acquisition adjustments to the processor to, for example, adjust a resolution of the camera, adjust a focus of the camera, or adjust an aspect ratio of the images captured by the camera, among other self-remediation instructions in some embodiments. As output, the trained ICCSMS neural network may present optimized AV processing instruction adjustments to the processor to, for example, adjust operation of compression AV processing instruction module 384, color shift AV processing instruction module 385, or encoding/decoding AV processing instruction module 386 in some embodiments.

Similarly, the AV processing instruction manager 341 may direct the video processing engine 380 to execute the other AV processing instruction modules 381, 382, 383 in order to provide additional data to the trained ICCSMS neural network 244. For example, the AV processing instruction manager 341 may cause the processor to execute a compression artifact AV detection processing instruction module 382. The compression artifact AV detection processing instruction module 382 may be computer executable instructions that, when executed by a processor of the information handling system, computes a level of compression artifacts that exist in the video frames. In an embodiment, the transmission of video frames across the network may involve the compression and decompression of videos sent from one information handling system to another information handling system during the execution of the MMCA. During this time, certain compression and decompression algorithms of a compression artifact AV detection processing instruction module 382 may create compression artifacts that may alter the appearance of any of the video frames. In an embodiment, a standard linear RGB operation may be performed by the compression artifact AV detection processing instruction module 382 that better detects an incorrect blending of colors between neighboring pixels in the image frame. In this embodiment, if a level of compression artifacts is detected, such data may be presented to the trained ICCSMS neural network as input along with any other types of input. In an embodiment, if a threshold level of compression artifacts is detected, then the data is provided to the trained ICCSMS neural network as input. Where the threshold level of compression artifacts is not met, no data descriptive of the compression artifacts is sent to the trained ICCSMS neural network. The compression artifact AV detection processing instruction module 382 may be, in an embodiment, computer executable instructions that, when executed by a processor (CPU, GPU, VPU, GNA) of the information handling system, applies a compression analysis algorithm such as a standard linear RGB operation to each video frames received at the MFPIP 338 in order to calculate the amount of compression artifacts present in the video frames. As output, the trained ICCSMS neural network may present optimized instructions that includes instruction describing optimized AV processing instruction adjustments to the processor to, for example, adjust an encoding/decoding algorithm of the encoding/decoding AV processing instruction module 386 used to decompress and compress, respectively, each video frame among other self-remediation instructions.

In an embodiment, the AV processing instruction manager 341 may cause the processor to execute a color vector AV detection processing instruction module 383. The color vector AV detection processing instruction module 383 may be computer executable instructions that, when executed by a processor of the information handling system, computes a level of color vector artifacts that exist in the video frames. In an embodiment, the transmission of video frames including using the compression and decompression processes of videos may cause some color vectors within the image frame to be changed or distorted. The execution of the color vector AV detection processing instruction module 383, in an embodiment, may include executing a Buten's parametric model to describe an achromatic contrast sensitivity function that exceeds, for example, a contrast threshold that can be detected by a human eye to indicate that a color vector artifact is detected when exceeded. In this embodiment, if a level of color vector artifacts is detected, such data may be presented to the trained ICCSMS neural network as input along with any other types of input. In an embodiment, if a threshold level of color vector artifacts is detected, then the data is provided to the trained ICCSMS neural network as input. Where the threshold level of color vector artifacts is not met, no data descriptive of the color vector artifacts is sent to the trained ICCSMS neural network. The color vector artifact AV detection processing instruction module 383 may be, in an embodiment, computer executable instructions that, when executed by a processor (CPU, GPU, VPU, GNA) of the information handling system, applies a color vector analysis algorithm to each video frames received at the MFPIP 338 in order to calculate the amount of color vector artifacts present in the video frames. As output, the trained ICCSMS neural network may present computer instructions to the processor to, for example, optimize media acquisition adjustments by adjusting how the video camera firmware and software interpret color data received at the image sensor of the video camera, adjusting the image sharpness captured by the video camera, adjusting the image resolution captured by the video camera, among other self-remediation instructions.

In an embodiment, the AV processing instruction manager 341 may cause the processor to gather camera operation data for input into the trained ICCSMS neural network. The camera operation data may include a resolution of the camera, an aspect ratio of the camera and other operational characteristics of the video camera. A streaming media driver 327 that may include a camera driver may, in an embodiment, be computer executable instructions that, when executed by a processor (CPU, GPU, VPU, GNA) of the information handling system, adjusts a camera resolution during the processing of a stream of video frames received at the MFPIP 338 as directed by output instructions from the trained ICCSMS neural network.

In an embodiment, the AV processing instruction manager 341 may gather and transmit processor load, such as CPU load, or other processor operation data from an embedded controller for input into the trained ICCSMS neural network. The processor operation data may include consumption levels of a CPU or other processor during operation of a videoconference with the MMCA. Other hardware metrics may also be gathered for inputs into the trained ICCSMS neural network including memory usage levels, processing speeds, throttling if applicable and similar metrics. The embedded controller or other processor control may offload execution of one or more AV processing instruction modules to alternative processors (e.g., GPU, VPU, GNA) of the information handling system during the processing of a stream of video frames received at the MFPIP 338 as directed by output optimized instructions, such as optimized processor offload instructions from the trained ICCSMS neural network.

In an embodiment, the AV processing instruction manager 341 may cause the processor to execute a compression AV processing instruction module 384. The compression AV processing instruction module 384 may be computer executable instructions that, when executed by a processor of the information handling system, adjusts the compression algorithms used to compress the video frames. In order to transmit data over the network, the data packets may be encoded in order to compress the data. As described herein in connection with the operation of the compression artifact AV processing instruction module 384, the compression algorithm used may alter the ability of the information handling system to properly transmit and receive the video frames. In these situations, the processing resources and bandwidth may be limited especially where the algorithm used to compress the video frames before transmission requires a significant level of processing resources. In an embodiment, the trained ICCSMS neural network may provide, as output, instructions to the compression AV processing instruction module 384 to adjust the type of compression algorithm among other self-remediation instructions.

In an embodiment, the AV processing instruction manager 341 may cause the processor to execute a color shift AV processing instruction module 385. The color shift AV processing instruction module 385 may be computer executable instructions that, when executed by a processor of the information handling system, adjusts the firmware and software used by the video camera interprets color data received at the image sensor of the video camera, adjusting the image sharpness captured by the video camera, adjusting the image resolution captured by the video camera, among other self-remediation instructions. In an embodiment, the trained ICCSMS neural network may provide, as output, instructions to the color vector AV processing instruction module 385 to complete these self-remediation instructions.

In an embodiment, the AV processing instruction manager 341 may cause the processor to execute an encoding/decoding AV processing instruction module 386. The encoding/decoding AV processing instruction module 386 may be computer executable instructions that, when executed by a processor of the information handling system, adjusts the computer resources consumed via the execution of a specific encoding/decoding algorithm used to compress and decompress the video frames or adjusts the algorithm used to encode or decode the video frames at the MFPIP. In order to transmit data over the network, the data packets may be encoded in order to compress the data and then, when received at an information handling system, decoded to decompression such data again. As described herein in connection with the operation of the compression artifact AV processing instruction module 384, the encoding/decoding algorithm used may alter the ability of the information handling system to properly transmit and receive the video frames. In these situations, the processing resources and bandwidth may be limited especially where the algorithm used to encode and/or decode the video frames before and after transmission, respectively. In an embodiment, the trained ICCSMS neural network may provide, as output, instructions to the encoding/decoding AV processing instruction module to adjust the type of encoding and decoding algorithm among other self-remediation instructions.

As described herein, the multimedia processing control API 325 may operate, at least in part, as a hub to facilitate communication between various hardware, firmware, and software applications operating at information handling system, and the trained ICCSMS neural network. As another example of this, the multimedia processing control API 325 may receive software performance metrics generated at a diagnostic analysis application, for example, describing applications available or running, number of video conference participants, CPU usage or load, as well as a breakdown of the CPU usage attributable to each of a plurality of applications (e.g., including a MMCA) running via the operating system of the information handling system and provide that data to any of the AV detection processing instruction modules 381-386. The multimedia processing control API 325 may, including under the direction of the AV detection processing instruction modules 381-383 analyzing videoframe artifacts, forward these and other described inputs to the neural network of the trained ICCSMS, in an embodiment.

In an embodiment of the multimedia processing control API 325 facilitating communication with the trained ICCSMS neural network, the multimedia processing control API 325 may receive default media capture instructions, default AV processing instructions, or captured audio samples from a streaming media driver 327, as described in greater detail with respect to FIG. 2. In other embodiments, the multimedia processing control API 325 may receive default media capture instructions or default AV processing instructions via direct communication with the MFPIP 338. In an embodiment, the multimedia processing control API 325 (and streaming media driver 327) also helps to execute the changes to the operation of the camera by being operatively coupled to the trained ICCSMS neural network output and AV processing instruction manager 341. In an embodiment, the multimedia processing control API 325 may also help in initiating the changes to the AV processing modules by being operatively coupled to the trained ICCSMS neural network and AV processing instruction manager 341. The multimedia processing control API 325, in an embodiment, may also help to initiate the changes to the offloading of processes to other processing devices such as the CPU, GPU, GNA by being operatively coupled to the trained ICCSMS neural network and AV processing instruction manager 341.

In embodiments herein, an optimized output from the trained ICCSMS neural network may include an instruction to generate an IT service ticket identifying an issue with the videoframes, associate potential operating circumstances of the MMCA, or associating potential fixes or upgrades at one or more managed information handling systems participating in videoconference sessions to remedy the identified artifacts. The multimedia processing control API 325 may also direct an IT service ticket to be sent to an IT coordinating server where further service may be provided by an IT manager based on a persistent occurrence of detected blur artifacts, compression artifacts, or color vector artifacts being present in the video frames.

Figure 4:
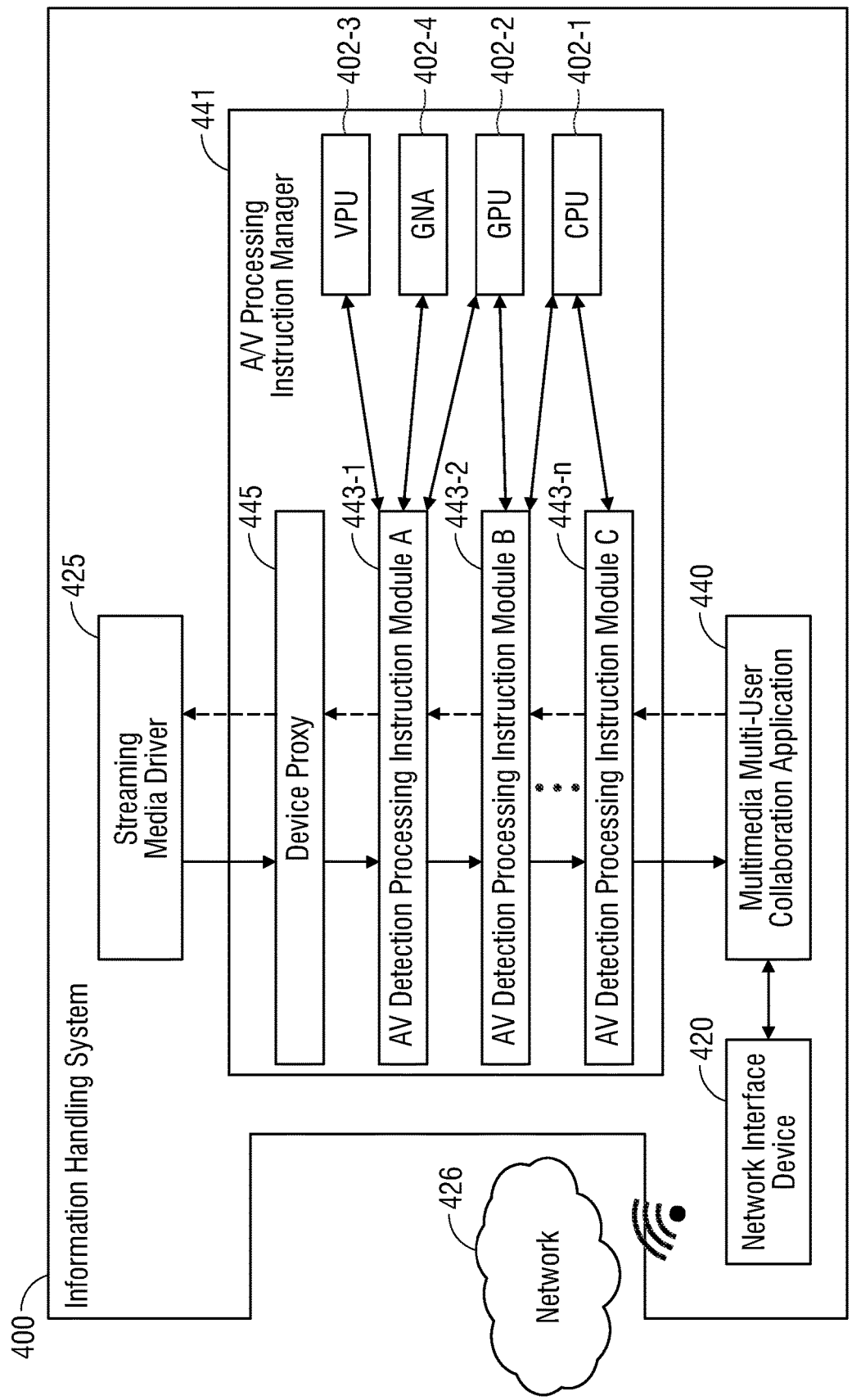
FIG. 4 is a block diagram illustrating audio/visual (AV) processing instruction manager for optimizing information handling system operation of a multimedia, multi-user collaboration application according to an embodiment of the present disclosure.

FIG. 4 is a block diagram illustrating audio/visual (AV) processing instruction manager for optimizing information handling system operation of a multimedia, multi-user collaboration application according to an embodiment of the present disclosure. FIG. 4 shows an AV processing instruction manager 441 interacting with a streaming media driver 425 and multimedia multi-user collaboration application (MMCA) 440 according to an embodiment of the present disclosure. In order to communicate with other information handling systems during the video conferencing session, the information handling system 400 includes a network interface device 420. The network interface device 420 can provide connectivity to a network, e.g., a wide area network (WAN), a local area network (LAN), wireless local area network (WLAN), a wireless personal area network (WPAN), a wireless wide area network (WWAN), or other networks to operatively couple the information handling system 400 to the remote information handling systems. Connectivity may be via wired or wireless connection. The network interface device 420 may operate in accordance with any wired or wireless data communication standards to enable communications for a videoconference via the MMCA. The network interface device ma also establish any other communication links, such as an out of band communication with a remotely located information handling system optimizer application for management of one or more information handling systems in embodiments herein. For example, an out of band communication, separate from the videoconference communication link, may be established for transmission of any generated IT service ticket identifying an issue with the videoframes, associated potential operating circumstances of the MMCA, or associated potential fixes or upgrades at one or more managed information handling systems participating in videoconference sessions to remedy any identified artifact issues.

As described herein, the AV processing instruction manager 441 may cause one or more AV detection processing instruction modules to provide input data to a trained ICCSMS neural network and receive, as output therefrom, processing instructions to remediate the occurrence of blur, compression, and color vector artifacts in subsequently-received image frames. As described herein, the AV processing instruction manager 441 may form part of a user's information handling system. In another embodiment, the processes and hardware associated with the AV processing instruction manager 441 may be remote from the information handling system in a distributed processing scenario allowing the information handling system 400 to be a thin client device.

As described herein, the AV processing instruction manager 441 may direct the execution of any number of AV detection processing instruction modules to each video frame produced by the camera and processor during the video conference session or received by the information handling system 400. In the embodiment shown in FIG. 4, these AV detection processing instruction modules may be chained together so as to successively analyze the video frames and provide input to the trained ICCSMS neural network in order to receive, as output, processing instructions to remediate the occurrence of blur, compression, and color vector artifacts in subsequently-received image frames. The AV processing instruction manager 441 may include a device proxy 445. The device proxy 445 may be any device that, in an embodiment, uses resources other than a main central processing unit (CPU) such as a GPU, a VPU, GNA, among others. In an embodiment, the device proxy 445 may route or map connections between physical pins of the streaming media driver 425 (or other drivers) and the AV processing instruction manager 441.

With the device proxy 445, the AV processing instruction manager 441 may apply a number of AV detection processing instruction modules 443-1, 443-2, 443-n (e.g., AV processing instructions A, B, and C, respectively). The AV detection processing instruction modules 443-1, 443-2, 443-n may include any sets of instructions defined by any number of the AV processing instruction modules used to compute data associated with a blur, color vector, or compression artifacts in a video frame to detect these artifacts or to apply post processing algorithms to AV data such as encoding/decoding algorithm used, compression/decompression, color shifting or other AV processing instruction modules. These AV processing instruction modules 443-1, 443-2, 443-n may include a blur AV detection processing instruction module, a compression artifact AV detection processing instruction module, a color vector AV detection processing instruction module, and one or more AV processing instructions to process AV data such as an encoding/decoding AV processing instruction module among others.

The information handling system 400 in an embodiment may include a plurality of processors, including, for example, a central processing unit (CPU) 402-1, a graphics processing unit (GPU) 402-2, a visual processing unit 402-3, and a gaussian neural accelerator (GNA) 402-4. The CPU 402-1 in an embodiment may execute the bulk of tasks relating to all software applications running via the operating system (OS), which may include the MMCA 440, the MFPIP incorporating the AV processing instruction manager 441, as well as several others. Increased processing load placed on the CPU 402-1 by the AV processing instruction manager 441 during execution of a user session for the MMCA 440 may decrease the processing resources left available for all other applications also running at the OS, which may include word processing applications (e.g., Microsoft® Word®), presentation applications (e.g., Microsoft® PowerPoint®), e-mail applications, web browsers, and other applications routinely used in conjunction with the multimedia multi-user collaboration application throughout a typical workday.

The GPU 402-2 in an embodiment may be a processor specialized for rapidly manipulating and altering video data to accelerate the creation of a video sample using a plurality of captures images stored in a frame buffer. GPU 402-2 may be more efficient at manipulating such stored video samples during image processing, analysis, and computing performed by one or more of the AV detection processing instruction modules 443-1, 443-2, 443-*n* in an embodiment. The VPU 402-3 in an embodiment may be specialized for running machine vision algorithms such as convolutional neural networks. The GNA 402-4 in an embodiment may comprise low-power co-processor to the CPU, or a System on a Chip (SoC) that can run under very low-power conditions to perform a specialized task, such as real-time translations ongoing conversations, or various other audio and video processing methods represented by any one of the AV detection processing instruction modules 443-1, 443-2, 443-*n*. The GNA 402-4 may operate in an embodiment to offload continuous inference workloads from the CPU 402-1, GPU 402-2, or VPU 402-3, including but not limited to noise reduction or speech recognition, to save power and free CPU 402-1 resources.

Each of the AV processing instruction modules 443-1, 443-2, 443-*n*, in an embodiment, may be sets of algorithms or code instructions executed via the operating system (OS), using one of the processors of the information handling system 400 for analysis and computing of video data or audio data relating to streaming video conferencing applications. It is understood that any number of AV processing instruction modules is contemplated in discussing 443-1 through 443-*n*. A single processor may execute each of the AV detection processing instruction modules 443-1, 443-2, 443-*n*, a sub-group thereof, or may even execute a single AV detection processing instruction module 443-1, 443-2, 443-*n*, according to various embodiments. The AV processing instruction manager 441, in an embodiment, may determine which processor to access in order to execute each AV detection processing instruction modules 443-1, 443-2, 443-*n* in an embodiment, based on instructions received from the trained ICCSMS neural network in some embodiments. For example, in an embodiment in which the information handling system 400 acts as the media source, the AV processing instruction manager 441 may access the VPU 402-3 or the GNA 402-4 to execute various video or audio processing algorithms supported by the features of the MMCA, as represented by AV detection processing instruction module A 443-1, pursuant to a computing instruction to avoid executing that AV detection processing instruction using the GPU 402-2 or CPU 402-1. As another example in such an embodiment, the AV processing instruction manager 441 may access the GPU 402-2 or CPU 402-1 to execute the audio or video computing algorithms represented by AV processing instruction module C 443-*n*. In yet another example in such an embodiment, the AV processing instruction manager 441 may access CPU 402-1 to multiplex the processed and encoded audio and video samples into a processed and encoded media sample.

In another example embodiment in which the information handling system 400 acts as the media sink to receive media samples captured at a remotely located information handling system, the AV processing instruction manager 441 may offload execution of the audio or video computation algorithm represented by AV processing instruction module C 443-*n* to the GPU 402-2. In another example of such an embodiment, the AV processing instruction manager 441 may offload execution of various video or audio processing algorithms supported by the features of the MMCA, as represented by AV detection processing instruction module B 443-2 to the GPU 402-2, GNA 402-4, or VPU 402-3. In such a way, the AV processing instruction manager 441 may retrieve audio and video samples from an external media source information handling system and perform one or more processing methods on the retrieved audio and video samples in accordance with trained ICCSMS neural network output processing instructions received from the trained ICCSMS neural network and operate with the MMCA 440.

During operation, the streaming media driver 425 may be executed by a processor of the information handling system 400 to distribute the video frames, in this embodiment, to the AV processing instruction manager 441. As described herein, the streaming media driver 425 in such an embodiment may receive video or audio samples captured by video cameras or microphones in communication therewith, according to default or optimized media capture instructions. The AV processing instruction manager 441 may direct the execution and application of each of the AV processing instruction modules 443-1, 443-2, 443-*n* to each of the video frames. The AV processing instruction manager 441 may cause a one or more of the AV detection processing instruction modules 443-1, 443-2, 443-*n* to the video frames in series and may, in an embodiment, cause the reapplication of these AV detection processing instruction modules 443-1, 443-2, 443-*n* to each of the video frames. In an embodiment, any of the blur AV detection processing instruction module, compression artifact AV detection processing instruction module, color vector AV detection processing instruction module, and encoding/decoding AV processing instruction module may, when executed, require additional modification by a previously applied AV processing instruction modules 443-1, 443-2, 443-*n* based on optimized AV processing instruction adjustments from the trained ICCSMS neural network in order to best process the AV data the execution of these AV detection processing instruction modules 443-1, 443-2, 443-*n* for post processing.

As described herein, the AV processing instruction manager 441 may be a processor that, in an embodiment, offloads the processing to other types of processing devices such as a GPU, GNA, dedicated CPU, VPU, among others via an optimized processor offload instruction adjustment from a trained ICCSMS neural network. In an embodiment, the processor may be used to offload processes of one or more of the AV processing instruction modules 443-1, 443-2, 443-*n* so that the first processor (e.g., CPU) may execute other applications such as a word processing application, a visual presentation program or the like in order to better engage with the other users engaged in the video conference session.

Figure 5:
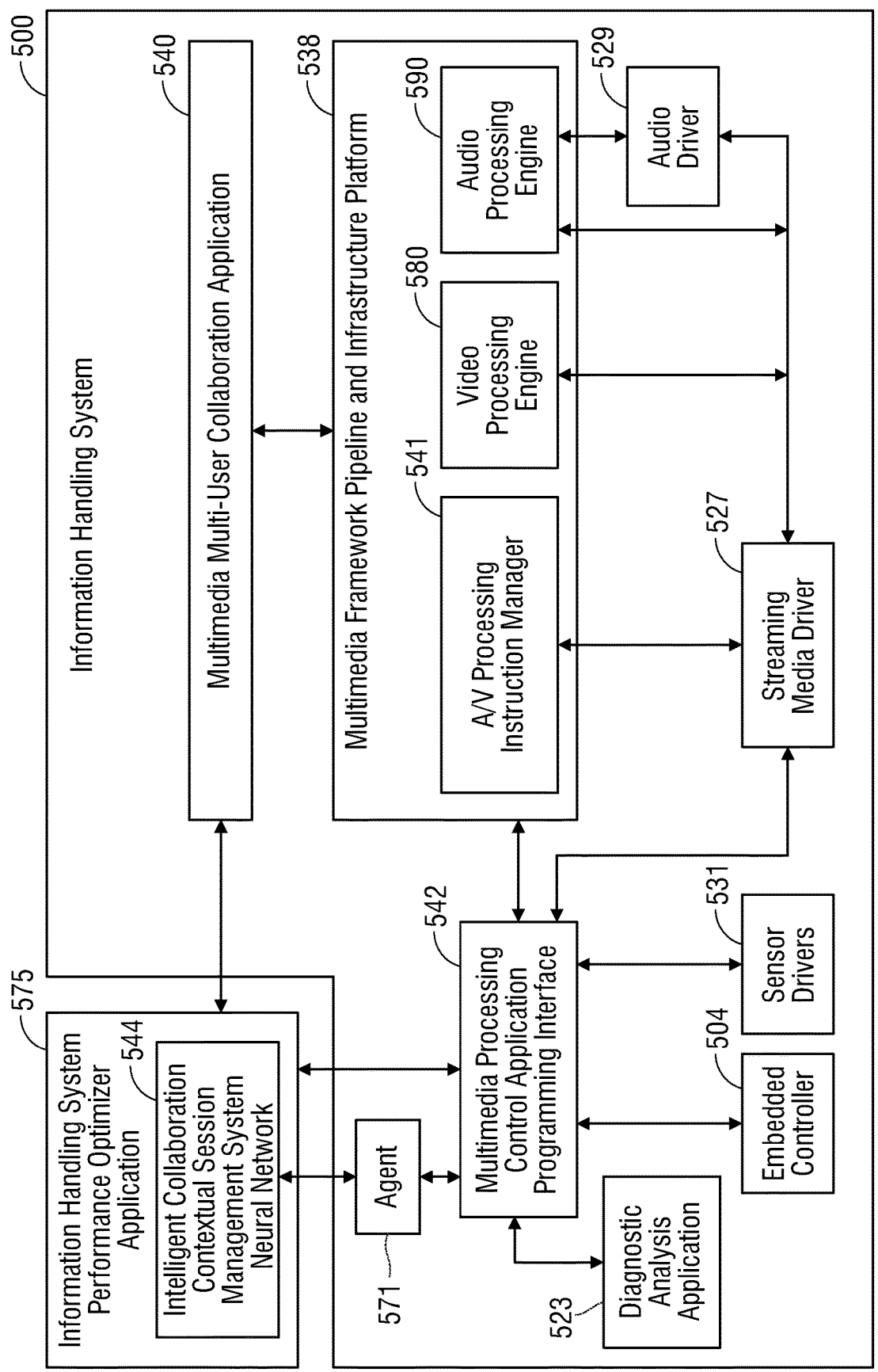
FIG. 5 is a block diagram illustrating a first embodiment of an intelligent collaboration contextual session management system for optimizing information handling system operation of a multimedia, multi-user collaboration application according to an embodiment of the present disclosure.

FIG. 5 is a block diagram illustrating an information handling system 500 according to another embodiment of the present disclosure. FIG. 5 shows the interactions between the different hardware, software, and firmware components of the information handling system 500 relative to an information handling system performance optimizer application 575 that includes an ICCSMS to train or execute a trained ICCSMS neural network 544. As described herein, the trained ICCSMS neural network 544 are code instructions executing on one or more processors of an information handling system 500 executing the information handling system performance optimizer application 575, or one or more processors of information handling system 500 participating in a video conference via MMCA 540. The trained ICCSMS neural network 544 may operate remotely at 575 or locally at an agent 571 in an embodiment and may generate output processing instruction adjustments to remediate the occurrence of blur, compression, and color vector artifacts in image frames received at the information handling system 500. In further embodiments, the trained ICCSMS neural network 544 may be used to optimized the processing and presentation of during execution of the MMCA 540. In an embodiment, the trained ICCSMS neural network 544 may be used to generate a service ticket to be received by an IT manager at an IT coordination server remote, such as an information handling system operating an information handling system performance optimizer application 575, from the information handling system 500.

In an embodiment, the information handling system performance optimizer application 575 may be an application executed remote from the information handling system 500 such that the data received from the execution of the AV detection processing instruction modules is sent to the ICCSMS neural network to train a neural network, transmit or execute the trained neural network, and update training for the trained neural network. For ease of understanding the ISSCMS may provide a trained neural network 544 to the information handling system 500 at the agent 571. In an embodiment, the information handling system performance optimizer application 575 may be remote from the information handling system 500. The trained ICCSMS neural network may also receive data detected by certain sensors and algorithms and provided as input to the trained ICCSMS neural network at the agent 571 for example to provide, as output, processing instructions to remediate the occurrence of blur, compression, and color vector artifacts in image frames. This may allow the video frames to be adjusted visually to increase the visual composition of the video frames or to output an IT service ticket as described herein. In an embodiment, the trained ICCSMS neural network at or accessible by the agent 571 may be used to generate a service ticket to be received by an IT manager at an IT coordination server remote from the information handling system.

The information handling system 500 described with reference to FIG. 5 may represent a transmitting, media source information handling system or a receiving, media sink information handling system in various embodiments. In still other embodiments, information handling system 500 may operate as both a transmitting, media source information handling system and a receiving, media sink information handling system, as may be the case for an information handling system transmitting video of one participant user while simultaneously executing code instructions for the multimedia multi-user collaboration application 550 to display videos of other participants within a shared user session of a video conferencing system. In one example embodiment, the trained ICCSMS neural network 544 operating at agent 571 may be an application operating within the OS for the information handling system 500, including execution of a trained neural network for determining optimized processing instructions to remediate the occurrence of blur, compression, and color vector artifacts in the image frames. For example, the information handling system 500 may execute any or all of the trained ICCSMS neural network 544 at agent 571 via a processor (e.g., processor 102 executing code instructions of the trained ICCSMS neural network described with reference to FIG. 1) or embedded controller 504. In another example embodiment, the trained ICCSMS neural network 544 may be an application operating in whole or in part as part of an information handling system performance optimizer application 575 at an information handling system located remotely from the information handling system 500. In one example embodiment, an ICCSMS agent 571 or portion of the trained ICCSMS neural network 544 may be operating at the information handling system 500 while another portion operates remotely. The ICCSMS agent 571 executing the trained ICCSMS neural network locally in such an embodiment may be executing a trained ICCSMS neural network or optionally directing inputs or outputs to and from a remote trained ICCSMS neural network 544 and may be in communication with the multimedia processing control API 542 via an internal bus of information handling system 500. The ICCSMS agent 571 may also be in communication with the information handling system performance optimizer application 575 via a network interface device, as described in greater detail with respect to FIG. 1.

The information handling system performance optimizer application 575 in an embodiment may operate remotely from the information handling system 500 in an embodiment. For example, the information handling system performance optimizer application 575 may operate on a server, blade, rack, or cloud-based network maintained and controlled by the manufacturer of several information handling systems, or managed by an employer or enterprise owner of several information handling systems, including information handling system 500. In such an embodiment, the information handling system performance optimizer application 575 may operate to monitor certain performance metrics at each of the plurality of such information handling systems (e.g., including 500), perform firmware and software updates, confirm security credentials and compliance, and manage user access across the plurality of information handling systems (e.g., as owned by an employer or enterprise corporation, and including 500).

The trained ICCSMS neural network 544, in an embodiment, may make optimization determinations as described herein on a per information handling system basis. Such a determination may be made based upon a plurality of inputs describing hardware and software performance metrics of the information handling system (e.g., 500) at issue, default media capture instructions and default AV processing instruction settings generated by the MMCA (e.g., 540), various sensor readings taken at the information handling system (e.g., 500), and meeting metrics for the MMCA 540 describing performance of that application and participation of the user of the information handling system 500 during a user session. These neural network input values may be gathered from a plurality of sensors, peripheral devices, the AV detection processing instruction modules, and other diagnostic applications, such as described in various example embodiments herein.

The multimedia processing control API 542 in an embodiment may operate, at least in part, as a hub, facilitating communication of each of these performance metrics, media capture instructions, and various sensor readings to the trained ICCSMS neural network 544, or agent 571 thereof. For example, processing capabilities may indicate processor types available or random-access memory (RAM) or other memory capabilities of an information handling system 500. In a further example, hardware performance metrics describing total processing load at one or more processors may be gathered via an embedded controller 504 in an embodiment, and transmitted to the multimedia processing control API 542 to be included with the data computed by the processing resource AV detection processing instruction module as described herein. The embedded controller 504 may also gather information describing state of charge for a power management unit, which may include a battery and an AC adapter, as described with reference to FIG. 1. The embedded controller 504 in an embodiment may gather such metrics through direct communication with the available processors (e.g., CPU, GPU, VPU, GNA, etc.) and with the power management unit (PMU). In some embodiments, such communication may occur in kernel mode.

In other embodiments, the information handling system performance optimizer application 575 may be in direct communication with the embedded controller 504 via out-of-band communications. In such embodiments, the hardware performance metrics (e.g., CPU load, current offload instructions, battery state of charge, current positional configuration of information handling system 500) may be determined by the embedded controller 504 in kernel mode and communicated to the information handling system performance optimizer application 575 directly during routine out-of-band communications between the information handling system performance optimizer application 575 and all managed information handling systems (e.g., including 500). Such out-of-band communications with the embedded controller 504 in an embodiment may be used to check security credentials or performance statistics for the information handling systems (e.g., 500), or to push software or firmware updates to the information handling systems, for example. During such routine maintenance, the information handling system performance optimizer application may accumulate, sort, and analyze all performance metrics received from all managed information handling systems (e.g., 500), including processing load across all available processors, default settings associating specific processors with specific tasks, or state of remaining charge of the battery incorporated within the PMU, for example. Out-of-band communications initiated in such a way between the embedded controller 504 and the information handling system performance optimizer application 575 may be via a wireless network such as Wi-Fi or cellular, or via wired connection.

As another example of gathering inputs for a trained ICCSMS neural network 544, software performance metrics may be generated at a diagnostic analysis application 523, based at least in part on communication between the diagnostic analysis application 523 and the processor of the information handling system 500. Such a diagnostic analysis application 523 may operate to gather metrics describing CPU usage or load, as well as a breakdown of the CPU usage attributable to each of a plurality of applications (e.g., including a multimedia multi-user collaboration application) running via the operating system of the information handling system 200. In some embodiments, the diagnostic analysis application 523 may provide similar metrics for other types of processors for the information handling system, including, for example, a graphics processing unit (GPU), vision processing unit (VPU), or gaussian neural accelerator (GNA). One example of such a diagnostic analysis application 523 in an embodiment may include the Microsoft® Diagnostic Data Viewer® software application. In an embodiment, these software performance metrics may be generated at the diagnostic analysis application 523 and transmitted to the neural network of the trained ICCSMS neural network 544 via multimedia processing controller API 542.

The information handling system 500 in FIG. 5 shows a local MMCA 540 that is executable by a processor of the information handling system 500. Similar to above, the information handling system 500 may be powered on via use of an on switch and a PMU. The PMU may power on an embedded controller 504 that, in an embodiment, executes a basic input/output system (BIOS) and, in an embodiment, an operating system (OS).

During operation, the trained ICCSMS neural network 544 receives a number of inputs in the form of AV detection processing instruction modules and sensor data. The data associated with these AV detection processing instruction modules and sensor data is used as input to a trained ICCSMS neural network 544 to provide, as output, processing instructions to remediate the occurrence of blur, compression, and color vector artifacts in subsequently-received image frames. Each of these AV detection processing instruction modules, when executed by the processor, help to adjust how those video frames are processed, manipulated, and/or transmitted, as described herein, by the trained neural network output AV processing instructions. In an embodiment, one of the outputs of the trained ICCSMS neural network includes instructions to generate an IT service ticket. The IT service ticket describes identification of artifact issues, associated causes identified, or what an IT manager should do to remediate persistent issues associated with blur artifacts, compression artifacts, or color vector artifacts. Such actions by the IT manager may include changing hardware within the information handling system, updating software executed on the information handling system, changing software executed on the information handling system, among other remedial actions. The IT service ticket, in an embodiment, may be sent to the IT manager from the trained neural network via an out-of-band communication channel different from the communication channel used by the MMCA to conduct the video conferencing session. In this embodiment, the MPCAPI 542 and optimizer information handling system 571 may be used to transmit this IT service ticket, such as to the information handling system performance optimizer application 575 in an example embodiment.

During the operations of the information handling system, a number of drivers associated with the streaming media driver 527 may be executed by the processor to enable an OS of the information handling system 500 and other computer programs to access hardware functions of the input/output devices, sensors, and the camera, among others. For example, the sensor drivers of the ICCSMS agent 571 may help to facilitate the transmission of data from the individual sensors and computations of the AV detection processing instruction modules to the processor or other processing device such as the AV processing instruction manager 541 responsible for providing this data to the trained ICCSMS neural network 544 as described herein.

As described herein, the streaming media driver 527 in such an embodiment may receive video or audio samples captured by peripheral cameras or microphones in communication therewith, according to default or optimized media capture instructions. In another embodiment, the audio driver 529 may receive audio samples captured by the microphone, for example, in communication therewith, according to such received media capture instructions. In such an embodiment, the audio driver 529 may operate as a mini-driver or child device to the parent device streaming media driver 527. The streaming media device driver 527 may be in communication with an AV processing instruction manager 541 via one or more ports such that video or audio samples received by the streaming media device driver 527 may be transmitted to an AV processing instruction manager 541, in an embodiment. The audio driver 529 may be in communication with the AV processing instruction manager such that audio samples received by the audio driver 529 may be transmitted to the AV processing instruction manager (e.g., via the audio processing engine, or via the streaming media driver, for example) in an embodiment. In such a way, the AV processing instruction manager may direct retrieval of a video sample captured at a camera operably connected to information handling system 500 and retrieval of an audio sample captured at a microphone operably connected to information handling system 500.

Figure 6:
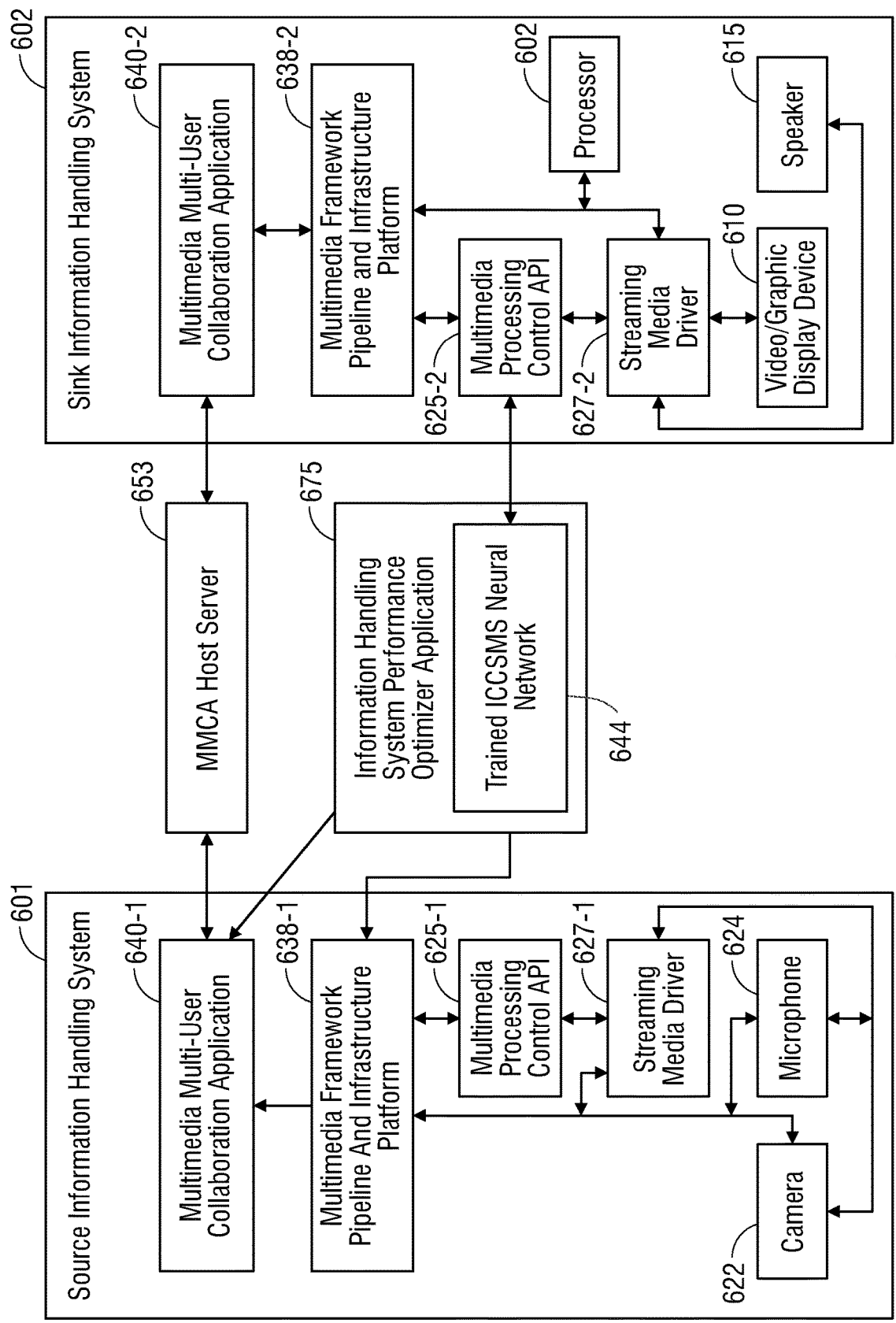
FIG. 6 is a block diagram illustrating a second embodiment of an intelligent collaboration contextual session management system for optimizing information handling system operation of a multimedia, multi-user collaboration application according to an embodiment of the present disclosure.

FIG. 6 is a block diagram illustrating a second embodiment of a trained ICCSMS neural network 644 for optimizing information handling system operation of a multimedia, multi-user collaboration application according to an embodiment of the present disclosure. User sessions may be hosted and coordinated by a MMCA host server 653 located remotely from, but in communication with one or more source information handling systems (e.g., 601) and one or more sink information handling systems (e.g., 602) via a network.

In an embodiment, the operations and processes conducted by the source information handling system 601 may be similar to those of the sink information handling system 602. Because the source information handling system 601 and sink information handling system 602 are engaged in the execution of an MMCA 640-1, 640-2 and participating in a video conference session, each of the source information handling system 601 and sink information handling system 602 are sending and receiving video frames among each other so that each user of the source information handling system 601 and sink information handling system 602 can view and hear, in real-time, the image and sounds produced by the other user. Therefore, the present specifications contemplate that the source information handling system 601 and sink information handling system 602 may perform concurrently those processes of the other at any given time.

As described herein, the source information handling system 601 and sink information handling system 602 each include a MMCA 640-1, 640-2. The MMCA 640-1, 640-2 may be any application that, when executed by the processor 102, initiate a video conference session between a plurality of users such as between the user of the source information handling system 601 and the sink information handling system 602. With the MMCA 640-1, 640-2 and per the user selections, the MMCA 640-1, 640-2 may present each video frame to the user at a respective video/graphic display device. Examples of a MMCA 640-1, 640-2 may include Zoom® developed by Zoom Video Communications, Skype® developed by Skype Technologies of Microsoft, Microsoft Teams® by Microsoft, WebEx® developed by Cisco, GoToMeeting® developed by LogMeIn, among others.

The MFPIP 638-1, 638-2 may include audio or video processing systems of the source information handling system 601 or sink information handling system 602 that applies any number of AV processing instruction modules to each of the video frames created as the video camera (e.g., webcam) provides those video frames to the video conference session executed by the MMCA 640-1, 640-2. In an embodiment, the MFPIP 638-1, 638-2 receives a stream of video frames and, via execution of these AV processing instruction modules include a blur AV detection processing instruction module, compression artifact AV detection processing instruction module, color vector AV detection processing instruction module, and other inputs form I/O devices, sensors, processor, and the MMCA, provides input to the trained ICCSMS neural network 544. The trained ICCSMS neural network 644 may operate remotely such as at the information handling system performance optimizer application 675 information handling system or locally at an agent on the source information handling system 601 or sink information handling system 602. The output from the trained ICCSMS neural network 544 includes processing instructions to remediate the occurrence of blur, compression, and color vector artifacts in received image frames at the MFPIP 638-1, 638-2.

Each of the source information handling system 601 and sink information handling system 602 may include a streaming media driver 627-1, 627-2. As described herein, the streaming media driver 527 in such an embodiment may receive video or audio samples captured by peripheral cameras or microphones in communication therewith, according to default or optimized media capture instructions. In another embodiment, the audio driver may receive audio samples captured by the microphone 624, for example, in communication therewith, according to such received media capture instructions. In such an embodiment, the audio driver may operate as a mini-driver or child device to the parent device streaming media device driver 627-1, 627-2. The streaming media device driver 627-1, 627-2 may be in communication with an AV processing instruction manager via one or more ports (e.g., as described in greater detail with respect to the of FIG. 4) such that video or audio samples received by the streaming media device driver 627-1, 627-2 may be transmitted to an AV processing instruction manager, in an embodiment. The audio driver may be in communication with the AV processing instruction manager such that audio samples received by the audio driver may be transmitted to the AV processing instruction manager (e.g., via the audio processing engine, or via the streaming media driver, for example) in an embodiment. In such a way, the AV processing instruction manager may direct retrieval of a video sample captured at a camera operably connected to information handling system and retrieval of an audio sample captured at a microphone operably connected to information handling system 500.

The source information handling system 601 and sink information handling system 602 may further includes a MPCAPI 625-1, 625-2. The MPCAPI 625-1, 625-2 in an embodiment may operate to facilitate communication between various applications, controllers, and drivers of the information handling system in an embodiment. For example, the MPCAPI 625-1, 625-2 may interface between a MFPIP 638-1, 638-2 and the sensors of the sensor array such as the camera, a processor resource monitoring system, and a bandwidth resource monitoring system, among others. The MPCAPI 625-1, 625-2 may, during operation of the information handling systems, receive the individual video frames and direct one or more AV detection processing instruction modules to be executed in order to provide computational data to the trained ICCSMS neural network 644 to generate remediating processing instructions to the source information handling system 601 or the sink information handling system 602 during execution of the MMCA.

In the embodiment, the source information handling system 601, as well as the sink information handling system 602, may include a microphone 624 used to receive sounds from the user and, with the audio driver 629 and other audio processing devices, create audio used to accompany the video output by the MMCA 640-1, 640-2. The source information handling system 601, as well as the sink information handling system 602, may include a camera 622 used to capture images of the users while engaged with the video conference session executed by the MMCA 640-1, 640-2.

Similar to FIG. 5 above, FIG. 6 shows the interactions between the different hardware, software, and firmware components of the source information handling system 601 and sink information handling system 602 relative to an information handling system performance optimizer application 675. The information handling system performance optimizer application 675 may include the trained ICCSMS neural network 644 operating remotely in whole or in part in an embodiment. In an embodiment, the information handling system performance optimizer application 675 may be an application executed remotely from the source information handling system 601 and sink information handling system 602 such that the trained ICCSMS neural network 644 may be executed remotely and output processing instructions may be transmitted over, for example, a network or may generate an IT service ticket for the information handling system optimizer application 675. In an embodiment, an information handling system performance optimizer application 675 may be not local to the information handling systems 601 or 602. In some embodiments, the MMCA may be at least partially a web-based application that provides or helps to facilitate the services described herein to multiple users over a network such as at MMCA host server 653.

In an alternative embodiment, an agent local to the source information handling system 601 or sink information handling system 602 can receive a trained ICCSMS neural network from the information handling system performance optimizer application 675 as described with FIG. 5. In this embodiment, the agent may execute the trained ICCSMS neural network 644 locally in either or both of the source information handling system 601 or sink information handling system 602 in order to provide the optimized processing instructions for remediation or IT ticket generation described herein.

As described, an AV processing instruction manager may send input from one or more sensors and from the AV detection processing instruction modules to the trained ICCSMS neural network 644 and provide, as output, processing instructions to remediate the occurrence of blur, compression, and color vector artifacts in received image frames. In an embodiment, one of the outputs of the trained neural network includes instructions to generate an IT service ticket. The IT service ticket describes a type of artifact issue in videoframes, corresponding causes or operating circumstances, or what an IT manager should do to remediate persistent issues associated with blur artifacts, compression artifacts, or color vector artifacts. Such actions by the IT manager may include changing hardware within the information handling system, updating software executed on the information handling system, changing software executed on the information handling system, among other remedial actions. In this embodiment, the AV processing instruction manager may cause a video processing engine to execute one or more of a blur AV detection processing instruction module, a compression artifact AV detection processing instruction module, a color vector AV detection processing instruction module, as well as AV processing instruction modules such as a processing resource AV detection processing instruction module, a network bandwidth AV detection processing instruction module, a camera resolution AV detection processing instruction module, and an encoding/decoding AV detection processing instruction module, among other AV processing instruction modules to post-process the AV data for presentation or transmission. During operation of the MFPIP 638-1, 638-2, the video frames received at the MFPIP 638-1, 638-2 are evaluated using these AV detection processing instruction modules for blur, compression, or color vector artifacts. For example, the execution of the blur AV detection processing instruction module may cause the MFPIP 638-1, 638-2 to compute a level of blur within any video frame presented at the MFPIP 638-1, 638-2. In this embodiment, if a level of blur is detected, such data may be presented to the trained ICCSMS neural network as input along with any other types of input. In an embodiment, if blur is detected then that data is provided to the trained ICCSMS neural network as input. The blur AV detection processing instruction module may be, in an embodiment, computer executable instructions that, when executed by a processor (CPU, GPU, VPU, GNA) of the information handling system, applies a fast Fourier transform (FFT) to each video frame received at the MFPIP 638-1, 638-2 in order to calculate the amount of blur present in the video frame. As output, the trained ICCSMS neural network 644 may present optimized acquisition adjustments to the processor to, for example, adjust a resolution of the camera, adjust a focus of the camera, or adjust an aspect ratio of the images captured by the camera, among other self-remediation instructions.

Similarly, the AV processing instruction manager may cause the processor to execute a compression artifact AV detection processing instruction module. The compression artifact AV detection processing instruction module may be computer executable instructions that, when executed by a processor of the information handling system, computes a level of compression artifacts that exist in the video frames. In an embodiment, the transmission of video frames across the network may involve the compression and decompression of videos sent from one information handling system to another information handling system during the execution of the MMCA. During this time, certain compression and decompression algorithms of a compression artifact AV detection processing instruction module may create compression artifacts that may alter the appearance of any of the video frames. In this embodiment, if a level of compression artifacts is detected, such data may be presented to the trained ICCSMS neural network as input along with any other types of input. In an embodiment, if a threshold level of compression artifacts is detected, then the data is provided to the trained ICCSMS neural network as input. Where the threshold level of compression artifacts is not met, no data descriptive of the compression artifacts is sent to the trained ICCSMS neural network 644. The compression artifact AV detection processing instruction module may be, in an embodiment, computer executable instructions that, when executed by a processor (CPU, GPU, VPU, GNA) of the information handling system, applies a compression analysis algorithm to each video frames received at the MFPIP in order to calculate the amount of compression artifacts present in the video frames that may appear as blockiness artifacts (e.g., blocky appearance of a videoframe due to data loss) in the videoframes as described herein. As output, the trained ICCSMS neural network 644 may present instructions that includes instruction describing optimized AV processing instruction adjustments to the processor to, for example, adjust an encoding/decoding algorithm of the encoding/decoding AV processing instruction module or the compression AV processing instruction module used to decompress and compress, respectively, each video frame among other self-remediation instructions.

In an embodiment, the AV processing instruction manager may cause the processor to execute a color vector AV detection processing instruction module. The color vector AV detection processing instruction module may be computer executable instructions that, when executed by a processor of the information handling system, computes a level of color vector artifacts that exist in the video frames. In an embodiment, the transmission of video frames including using the compression and decompression processes of videos may cause some color vectors within the image frame to be changed or distorted. In this embodiment, if a level of color vector artifacts is detected, such data may be presented to the trained ICCSMS neural network 644 as input along with any other types of input. In an embodiment, if a threshold level of color vector artifacts is detected, then the data is provided to the trained ICCSMS neural network 644 as input. Where the threshold level of color vector artifacts is not met, no data descriptive of the color vector artifacts is sent to the trained ICCSMS neural network 644. The color vector artifact AV detection processing instruction module may be, in an embodiment, computer executable instructions that, when executed by a processor (CPU, GPU, VPU, GNA) of the information handling system, applies a color vector analysis algorithm to each video frames received at the MFPIP 638-1, 638-2 in order to calculate the amount of color vector artifacts present in the video frames. As output, the trained ICCSMS neural network 644 may output optimized computer instructions to the processor such as, for example, optimized media acquisition adjustments by adjusting how the video camera firmware and software interpret color data received at the image sensor of the video camera, adjusting the image sharpness captured by the video camera, adjusting the image resolution captured by the video camera, among other self-remediation instructions.

In an embodiment, the processor to gather camera operation data from streaming media drivers 627-1 or 627-2, including any camera drivers, for input into the trained ICCSMS neural network. The camera operation data may include a resolution of the camera, an aspect ratio of the camera and other operational characteristics of the video camera. The streaming media drivers 627-1 or 627-2, including any camera drivers, may be computer executable instructions that, when executed by a processor of the information handling system, sets or adjusts a camera resolution during the operation of the MMCA. In an embodiment, the transmission of video frames to and from each information handling system (e.g., throughput) operatively coupled together over the network consumes bandwidth and may consume large amounts of processing resources and bandwidth. In these situations, the processing resources and bandwidth may be limited especially where the camera resolution is high enough to consume these resources. In this embodiment, if a level of camera resolution is detected, such data may be presented to the trained ICCSMS neural network 644 as input along with any other types of input. In an embodiment, if a threshold level of camera resolution is detected, then the data is provided to the trained ICCSMS neural network 644 as input. Where the threshold level of camera resolution is not met, no such data is sent to the trained ICCSMS neural network 644. The streaming media drivers 627-1 or 627-2, including any camera drivers report a current camera resolution during the processing of a stream of video frames received at the MFPIP 638-1, 638-2 in order to provide such data to the trained ICCSMS neural network 644. In an embodiment, the trained ICCSMS neural network 644 may provide, as output, instructions to adjust the camera resolution at the streaming media drivers 627-1 or 627-2, including any camera drivers, among other self-remediation instructions.

In an embodiment, the AV processing instruction manager may cause the processor to execute a compression AV processing instruction module. The compression AV processing instruction module may be computer executable instructions that, when executed by a processor of the information handling system, adjusts the compression algorithms used to compress the video frames. In order to transmit data over the network, the data packets may be encoded in order to compress the data. As described herein in connection with the operation of the compression artifact AV processing instruction module, the compression algorithm used may alter the ability of the information handling system to properly transmit and receive the video frames. In these situations, the processing resources and bandwidth may be limited especially where the algorithm used to compress the video frames before transmission requires a significant level of processing resources. In an embodiment, the trained ICCSMS neural network may provide, as output, instructions, such as AV processing instruction adjustments to the compression AV processing instruction module 384 to adjust the type of compression algorithm among other self-remediation instructions.

In an embodiment, the AV processing instruction manager may cause the processor to execute a color shift AV processing instruction module. The color shift AV processing instruction module may be computer executable instructions that, when executed by a processor of the information handling system, adjusts the firmware and software used by the video camera to interpret color data received at the image sensor of the video camera, adjusting the image sharpness captured by the video camera, adjusting the image resolution captured by the video camera, among other self-remediation instructions. In an embodiment, the trained ICCSMS neural network may provide, as output, optimized AV processing instruction adjustments to the color vector AV processing instruction module to complete these self-remediation instructions.

In an embodiment, the AV processing instruction manager may cause the processor to execute an encoding/decoding AV processing instruction module. The encoding/decoding AV processing instruction module may be computer executable instructions that, when executed by a processor of the information handling system, adjusts the computer resources consumed via the execution of a specific encoding/decoding algorithm used to compress and decompress the video frames or adjusts the algorithm used to encode or decode the video frames at the MFPIP. In order to transmit data over the network, the data packets may be encoded in order to compress the data and then, when received at an information handling system, decoded to decompression such data again. As described herein in connection with the operation of the compression artifact AV processing instruction module, the encoding/decoding algorithm used may alter the ability of the information handling system to properly transmit and receive the video frames. In these situations, the processing resources and bandwidth may be limited especially where the algorithm used to encode and/or decode the video frames before and after transmission, respectively. In an embodiment, the trained ICCSMS neural network 644 may provide, as output, AV processing adjustment instructions to the encoding/decoding AV processing instruction module to adjust the type of encoding and decoding algorithm among other self-remediation instructions to the encoding/decoding AV processing instruction module to select among encoding algorithms. The adjustments to the encoding/decoding AV processing instruction module per the output of the neural network may remediate compression artifacts seen in the video frame as blockiness. Additionally, one of the outputs of the trained neural network includes instructions to generate an IT service ticket. The IT service ticket describes an identified issue, any correlating causes or MMCA operating settings or conditions, or any corresponding remedies as described in embodiments herein.

As described herein, the multimedia processing control API 625-1, 625-2 may operate, at least in part, as a hub to facilitate communication between various hardware, firmware, and software applications operating at information handling system, and the trained ICCSMS neural network 644. As another example of this, the multimedia processing control API 625-1, 625-2 may receive software performance metrics generated at a diagnostic analysis application, for example, describing applications available or running, number of video conference participants, hardware metrics such as CPU usage or load (e.g., from an embedded controller), as well as a breakdown of the CPU usage attributable to each of a plurality of applications (e.g., including a MMCA) running via the operating system of the information handling system and provide that data to any of the AV detection processing instruction modules. The multimedia processing control API 625-1, 625-2 may forward these and other inputs described in various embodiments of the present disclosure to the trained ICCSMS neural network, in an embodiment.

Figure 7:
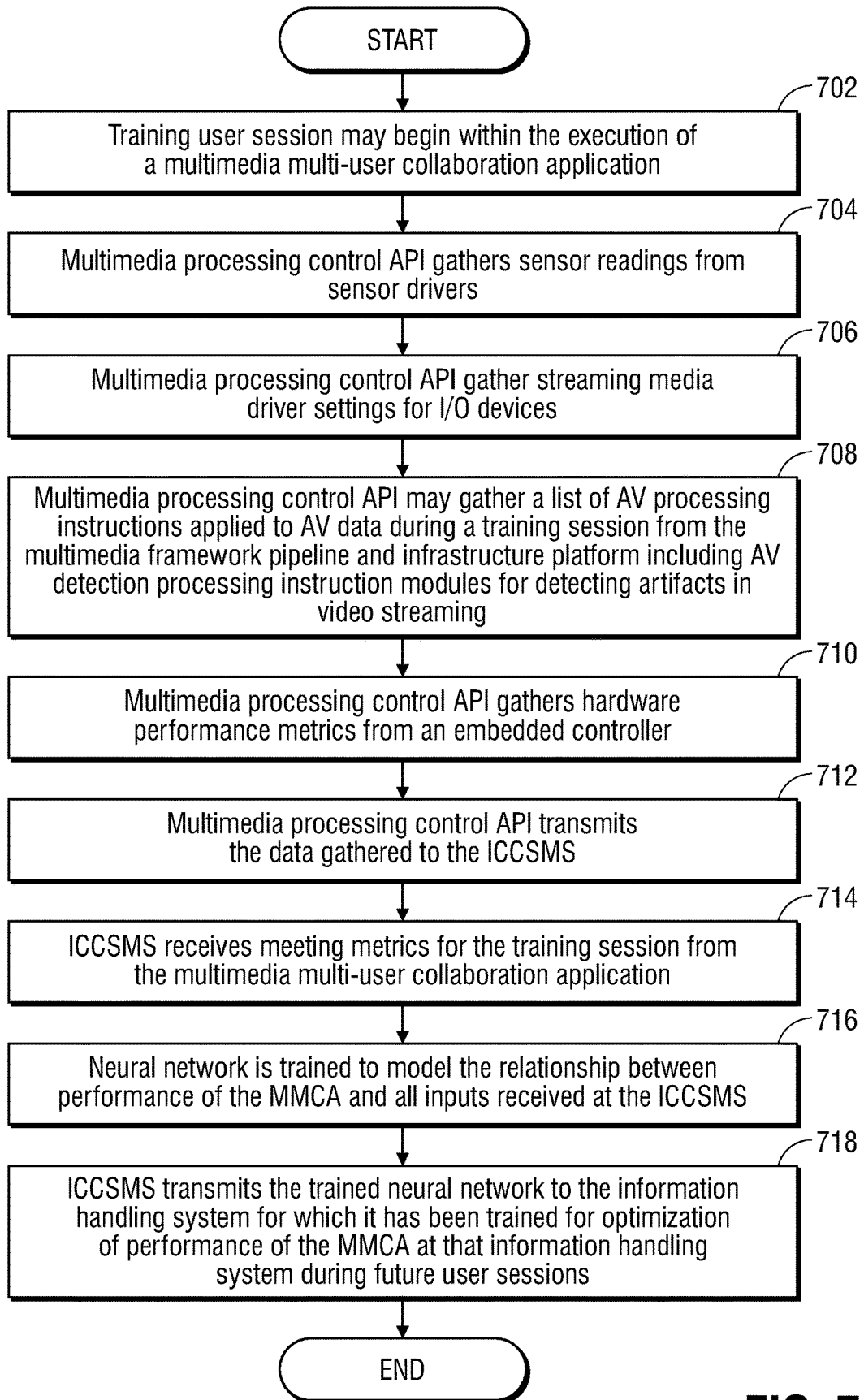
FIG. 7 is a flow diagram illustrating a method of training a neural network to optimize performance of a multimedia multi-user collaboration application of an information handling system according to an embodiment of the present disclosure.

FIG. 7 is a flow diagram illustrating a method of training a neural network of the ICCSMS to generate output of optimized processing instructions to detect and remediate the occurrence of blur, compression, and color vector artifacts in an image frame, AV processing instruction adjustments, network communication adjustments, and offload settings that optimize performance of a multimedia multi-user collaboration application or generation of IT service tickets during a training user session according to an embodiment of the present disclosure. Once trained, the trained ICCSMS neural network in an embodiment may gather input variables describing media capture settings for capturing audio and video samples during such a training user session, as well as a list of artifacts discovered within a video frame and the processors that executed these AV processing instructions. These input variables may be gathered for a plurality of training sessions in which a single information handling system participates, in order to tailor the neural network to optimize performance of the MMCA as it is executed at that specific information handling system in an embodiment. The ICCSMS may further gather meeting metrics describing performance of the MMCA or the aspect of the video conference such as the number of participants, presentations active, virtual backgrounds used, or other details during such training user sessions as described herein. By comparing different settings for the media capture, artifacts discovered within a video frame, and the processors used to execute such AV processing instructions to these performance measurements, the neural network may learn to identify settings optimized to produce the best possible performance values and processing instructions for the MMCA during future user sessions in which the information handling system for which the neural network has been trained may engage. Still further, by inputting this data into the ICCSMS, the ICCSMS may provide, as output, processing instructions used to remediate the occurrence of, for example, blurring in a video frame, compression issues within a video frame, and color vector artifacts present in a video frame. These instructions provide by the output from the trained ICCSMS neural network may be presented to a user of the information handling system, may be relayed to another user of a separate information handling system engaged in the video conferencing session, or to an IT server such as the information handling system performance optimizer application server described herein.

In an embodiment, the processing instructions may be used to create an IT service ticket to be sent to the IT coordinating server when a threshold number of video conference sessions engaged in by the information handling system experience the occurrence of blur, compression, and color vector artifacts. This remediation process may help to create a better video conferencing experience by identifying artifacts types, associated causes, if any, and describing what an IT manager should do to remediate persistent issues associated with blur artifacts, compression artifacts, or color vector artifacts.

At block 702, a training user session may begin within the multimedia multi-user collaboration application in an embodiment. For example, in an embodiment described with reference to FIG. 6, a source information handling system 601 and a sink information handling system 602 may both join a single user session for the MMCA (e.g., 640-1 and 640-2) via a central, networks MMCA host server 653, an agent of which may be operating at both the source information handling system 601 and the sink information handling system 602. It is understood that each information handling system 601 and 602 may function as a media source and as a media sink. A training user session may be differentiated from other user sessions in an embodiment in that applications, drivers, or firmware may provide media capture instructions, AV detection processing instruction modules operating and their calculations of types of artifacts, and feedback, such as from an IT manager or user, identifying processing instructions describing how to remediate the occurrence of blur, compression and color artifacts, or offload instructions. Only after such training user sessions have been completed may the ICCSMS in an embodiment generate, via a trained neural network, optimized processing instructions as output including optimized media capture instructions, optimized media acquisition instruction adjustments, optimized AV processing instruction adjustments, and optimized processor offload instructions describing how to remediate the occurrence of blur, compression and color artifacts, or optimized offload instructions. Additionally, the trained neural network may generate, as output, instructions to create an IT service ticket to be sent to the IT coordinating server identifying artifacts types, associated causes, if any, and describing what an IT manager or ICCSMS should do to remediate persistent issues at one or more information handling systems participating in videoconferencing sessions. A plurality of training user sessions may be completed in an embodiment prior to conclusion of the training phase for the neural network of the ICCSMS.

The multimedia processing control API may gather sensor readings from sensor drivers at block 704 in an embodiment. In an embodiment, the sensors may include a color sensor, an ambient light sensor (ALS), an image sensor, among others. In an embodiment described with reference to FIG. 2, various sensor readings may be taken by the information handling system 200 and communicated to the ICCSMS. More specifically, the information handling system 200 may include one or more sensors within a sensor array 230 as described in various embodiments herein. All sensor readings from sensors within the sensor array 230 in an embodiment may be transmitted to the sensor drivers 231. The multimedia processing control API may forward various sensor readings to the ICCSMS for determination of optimized settings using the neural network described herein.

The multimedia processing control API may gather default media capture instructions from a streaming media driver in an embodiment at block 706. For example, in an embodiment described with reference to FIG. 2, default media capture instructions and default AV processing instructions may be gathered via a streaming media driver 225 and transmitted to the ICCSMS. Default media capture instructions in an embodiment may be generated by the MMCA, or may be preset by the manufacturer of the camera, microphone, or information handling system 200. It is contemplated that any media capture instructions directing the capture by the camera of images or video or directing the capture by the microphone of audio that do not constitute optimized media capture instructions generated based on the output of the neural network described herein may constitute default media capture instructions. In another example embodiment described with reference to FIG. 5, the multimedia processing control API 576 may receive default media capture instructions from the streaming media driver 525. In another example embodiment described with reference to FIG. 5, the multimedia processing control API 576 may receive captured audio samples and video samples from a streaming media driver 525.

Such default media capture instructions and optimized media capture instructions may dictate a current method by which such audio, image, and video samples are captured. For example, in an embodiment described with reference to FIG. 2, media capture instructions may identify the frames per second at which the camera 222 may capture images for generation of a video, the resolution at which the camera captures and stores such images, the number of key frames in each preset time period, zoom settings, pan settings, or instructions to center the captured image around an identified object. As another example, media capture instructions may identify the bit rate at which the microphone 224 records and saves captured audio samples.

At block 708, the multimedia processing control API may gather a list of AV processing instructions applied to captured media during a training session from the MFPIP in an embodiment. For example, in an embodiment described with reference to FIG. 2, default AV processing instructions may be gathered via the streaming media driver 225 and transmitted to the ICCSMS. In another example embodiment described with reference to FIG. 5, the multimedia processing control API 576 may receive default AV processing instructions from the streaming media driver 525. In other embodiments, the multimedia processing control API 576 may receive default AV processing instructions via direct communication with the multimedia framework pipeline and infrastructure platform 540. Execution of certain software may, in an embodiment, also provide input to the ICCSMS at this point such as the execution of the AV detection processing instruction modules described herein. In an embodiment, the execution of a fast Fourier transform algorithm associated with a blur AV detection processing instruction module may cause the processor to discover a level of blur within a given video frame. Other sensors may be used to gather sensor data for input to the ICCSMS that detects an occurrence of blur, compression, and color vector artifacts among other artifacts.

In an embodiment, the multimedia processing control API may gather computations from execution of one or more AV detection processing instruction modules executing algorithms to detect errors or problems with streaming video frames. For example, a blur AV detection processing instruction module by the processor descriptive of a blur in an image frame received at a MFPIP may be executed. In this embodiment, the processor may execute the blur AV detection processing instruction module in order to determine how much, if any, blur exists in the video frames. Additionally, or alternatively, the multimedia processing control API may gather computations from an execution of a compression artifact AV detection processing instruction module by the processor descriptive of compression artifacts present in the image frame received at the MFPIP in an embodiment. In this embodiment, the processor may execute the compression artifact AV detection processing instruction module to determine how much, if any, compression artifacts such as "blockiness" in the video frames. Additionally, or alternatively, the multimedia processing control API may gather computations from an execution of a color vector AV detection processing instruction module by the processor descriptive of color vector artifacts present in the image frame received at the MFPIP. In this embodiment, the processor may execute the color vector AV detection processing instruction module to determine to what extent the color vectors within the video frames have been distorted.

At block 710, the multimedia processing control API may gather hardware performance metrics from an embedded controller in an embodiment. For example, in an embodiment described with reference to FIG. 5, hardware performance metrics describing total processing load at one or more processors may be gathered via an embedded controller 504 in an embodiment, and transmitted to the multimedia processing control API 576. The embedded controller 504 in an embodiment may gather such processing load metrics through direct communication with the processor (e.g., CPU, GPU, VPU, GNA, etc.). In other embodiments, the information handling system performance optimizer application 575 may be in direct communication with the embedded controller 504 via out-of-band communications. In such embodiments, the hardware performance metrics (e.g., CPU load, current offload instruction) may be determined by the embedded controller 504 in kernel mode and communicated to the information handling system performance optimizer application 575 directly during routine out-of-band communications between the information handling system performance optimizer application 575 and all managed information handling systems (e.g., including 500).

The multimedia processing control API in an embodiment may transmit the data gathered at steps 704-710 to the ICCSMS in an embodiment at block 712. By gathering this data, and transmitting it to the ICCSMS in an embodiment, the multimedia processing control API may operate as a sensor hub. For example, in an embodiment described with reference to FIG. 5, the multimedia processing control API 574 may forward any received, default media capture instructions, default AV processing instructions, captured audio samples, captured video samples, computations from an execution of the compression artifact AV detection processing instruction module, blur AV detection processing instruction module, and color vector AV detection processing instruction module, and various sensor readings to the ICCSMS 570 for determination of optimized settings using the neural network described herein. A neural network of the ICCSMS 570 may be separately trained for each information handling system (e.g., including 500) in communication with or managed by the information handling system performance optimizer application 575 in an embodiment. Such a training session may be performed based on the neural network input values gathered via the multimedia processing control API 576, as described with respect to FIG. 7 at blocks 704, 706, 708, and 710. Upon training of such a neural network unique to each information handling system (e.g., 500), the neural network may be ready to determine optimized settings for the information handling system for which it was trained (e.g., as described in greater detail with respect to block 716), based on updated input values.

At block 714, the ICCSMS in an embodiment may receive meeting metrics for the training session from the MMCA. For example, in an embodiment described with reference to FIG. 5, the ICCSMS 570 may be in communication with the MMCA 550 executing the training user session at the information handling system 500. In another embodiment, described with reference to FIG. 6, the ICCSMS 670 may receive meeting metrics from the MMCA host server 653 that hosts the training session. The ICCSMS 670 may receive one or more meeting metrics describing performance of the MMCA during execution of such a training user session in an embodiment. Such meeting metrics may include, for example, a measure of the CPU, GPU, and other processing resources consumed by the MMCA over time, during the training user session. Other example meeting metrics may include a measure of memory resources consumed. Still other example meeting metrics may compare CPU or other processors or memory usage by the multimedia multi-user collaboration application to total CPU or other processors or memory used by all applications, hardware, or firmware during the training user session. Yet other example meeting metrics may measure participation of the user during a user session, including, for example, a measure of the time spent muted, or whether the user is sharing his or her screen, whether a user has the camera on, or whether user's gaze is at the screen, among others. Still other example meeting metrics may measure bandwidth throughput over the network that measures, for each information handling system, the ability to transmit AV data over the network. This may include bandwidth available to each information handling system and whether that bandwidth may sufficiently deliver the AV data.

Such meeting metrics may also describe the performance of media sample processing, transmission, and playback among a plurality of information handling systems engaged in a single user session for the multimedia multi-user collaboration application. For example, meeting metrics gathered by the ICCSMS during a training session may describe latency, or a measurement of time elapsing between a first information handling system transmitting the processed, encoded media sample and a second information handling system receiving the processed, encoded media sample. As another example, meeting metrics may include a measurement of jitter, or a comparison between latency of playback for a media sample from one of the meeting participants, and latency of playback for another media sample from another of the meeting participants. Such jitter may cause the two separate media samples, which may have been recorded simultaneously, to playback such that they are out-of-sync with one another. Still other meeting metrics in an embodiment may measure bandwidth consumed by the multimedia multi-user collaboration application, type of network used to transmit and receive media samples, packet loss (e.g., of video or audio samples), resolution and frames per second of video samples (both at the transmitting side and the receiving side), audio bitrate (both at the transmitting side and the receiving side), and one or more codecs or compression algorithms in use. In some embodiments, jitter, packet loss, latency, resolution, and frames per second may be calculated separately for one or more of audio samples, video samples, and screen sharing samples. In still other examples, meeting metrics may be gathered by the multimedia multi-user collaboration application host server 653, and may describe the number of users, which users are screensharing, which users are using virtual backgrounds, which users are muted, and which participants are hosting, among other descriptions of participation among a plurality of users in a single video conference session.

A neural network may be trained in an embodiment to model the relationship between performance of the MMCA and artifacts or errors detected during video streaming and all inputs received at the ICCSMS at block 716. The ICCSMS may input each of the values gathered from the multimedia processing control API and the MMCA into a multi-layered, feed-forward, machine-learning neural network to train the neural network to model the relationship between one or more of the input values transmitted at block 712 and one or more performance metrics represented by the meeting metrics gathered at block 714. For example, the neural network may correlate media capture settings, AV detection processing instructions (e.g., via execution of one or more AV detection processing instruction modules identifying blur, compression artifacts such as a blockiness appearance, or color vector artifacts), or offload settings with certain meeting metrics for a user session. Such meeting metrics may include the CPU or other processor resource load consumed by the multimedia multi-user collaboration application during a user session, or latency, jitter, or packet loss as measured by the MMCA during a user session, or any other meeting metrics described herein.

The ICCSMS in an embodiment may model a multi-layered, feed-forward, machine-learning classifier neural network in an embodiment, for example, as a deep-learning 4 (DL4) neural network. More specifically, the neural network in an embodiment may comprise a multi-layer perceptron (MLP) classifier neural network. Several such multi-layered feed-forward, machine-learning classifier neural networks exist in the art, and any of these networks may be chosen to model this relationship between media capture settings, AV processing instruction adjustment, offload settings, and various meeting metrics for the MMCA described herein in an embodiment. For example, the DL4 neural network may operate in a Java programming language (e.g., DL4J), or within the Scala programming language (e.g., DL4S). Other deep-learning neural networks may be modeled using Apache® Maven®, for example. In still other embodiments, the DL4 neural network may be modeled using a plurality of classifiers, including a linear MLP classifier, a Moon MLP classifier, or a Saturn MLP classifier. Each of these types of MLP classifiers in an embodiment may define a different activation function that operates to define a relationship between separate layers of the neural network.

The neural network may include a plurality of layers, including an input layer, one or more hidden layers, and an output layer. The default media capture settings, default AV processing instruction settings, default offload settings, AV detection processing instruction modules identifying artifacts and their levels in video frames and meeting metrics gathered at blocks 704, 706, 708, 710, and 714 may form the input layer of the neural network in an embodiment. These input layers may be forward propagated through the neural network to produce an initial output layer that includes predicted media capture settings, predicted AV processing instruction adjustments, predicted offload settings, and predicted meeting metrics values. Such predicted meeting metrics values in an embodiment may include, for example, CPU resource load consumed by the multimedia multi-user collaboration application, indications of blur, compression (e.g., blockiness artifacts), or color artifacts or various other meeting metrics (e.g., latency, jitter, packet loss) for the multimedia multi-user collaboration application as measured during the training session.

Actual or known values for these meeting metrics (e.g., as predicted within the output layer) may have been gathered at block 714 in an embodiment. Further, the ICCSMS may have received known values for the media capture settings, AV detection processing instructions, and offload settings at block 712. Each of the output nodes within the output layer in an embodiment may be compared against such known values to generate an error function for each of the output nodes. This error function may then be back propagated through the neural network to adjust the weights of each layer of the neural network. The accuracy of the predicted meeting metric values (as represented by the output nodes) may be optimized in an embodiment by minimizing the error functions associated with each of the output nodes. Such forward propagation and backward propagation may be repeated serially during training of the neural network, adjusting the error function during each repetition, until the error function for all of the output nodes falls below a preset threshold value. In other words, the weights of the layers of the neural network may be serially adjusted until the output node for each of the meeting metrics, media capture settings, AV processing instruction settings, indications of blur, compression, or color vector artifacts and offload settings accurately predicts the known values received at blocks 712 and 714. In such a way, the neural network may be trained to provide the most accurate output layer, including a prediction of the MMCA application performance, based on various media capture settings, AV detection processing instructions, indications of artifacts and offload settings to assist with identifying artifact issues and potential causes of issues.

Such a training of the neural network in an embodiment based on known values received at blocks 712 and 714 during a user session of the MMCA may comprise a single training session. Such a training session in an embodiment may be repeated for several user sessions. Various media capture settings, AV processing instruction settings, indications of blur, compression, or color vector artifacts and offload settings may be applied, and in varying combinations with respect to one another, during these several user sessions. In such a way, the neural network may be trained to predict performance of the multimedia multi-user collaboration application (e.g., as measured by meeting metrics) in a plurality of varying conditions, as described by various combinations of different media capture settings, AV detection processing instruction indication of artifacts, and offload settings. Thus, the neural network is trained to output optimized media capture adjustments, optimize AV processing instruction adjustments to process AV data for display or transmission, optimize processor offload adjustment, and generate an IT service ticket identifying the issue, cause or solution suggestion. The IT service ticket describes a type of artifact detected, associated causes or MMCA operating circumstances, or what an IT manager or a central ICCSMS should do to remediate persistent issues associated with blur artifacts, compression artifacts, or color vector artifacts at one or more information handling systems participating in a videoconference. Such actions by the IT manager may include changing hardware within the information handling system, updating software executed on the information handling system, changing software executed on the information handling system, among other remedial actions.

At block 718, the ICCSMS in an embodiment may transmit the trained neural network to the information handling system for which it has been trained for optimization of performance of the MMCA at that information handling system during future user sessions. For example, in an embodiment described with respect to FIG. 5, upon training of the neural network unique to each information handling system (e.g., 500), the neural network may be ready to determine optimized settings for the information handling system for which it was trained, based on updated input values. In an embodiment, these optimized settings may be in the form of processing instructions to remediate the occurrence of blur, compression, and color vector artifacts in one or more image frames. The IT service ticket, in an embodiment, may be sent to the IT manager from the trained neural network via an out-of-band communication channel different from the communication channel used by the MMCA to conduct the video conferencing session. In this embodiment, the MPCAPI 542 and optimizer information handling system 571 may be used to transmit this IT service ticket. In some embodiments, this determination may be made by the neural network operating at the ICCSMS 570, located remotely from the information handling system 500. In other embodiments, the trained neural network for information handling system 500 may be transmitted from the ICCSMS 570 to an agent 571 thereof, operating at the information handling system 500. The method for training the neural network in an embodiment may then end.

Figure 8:
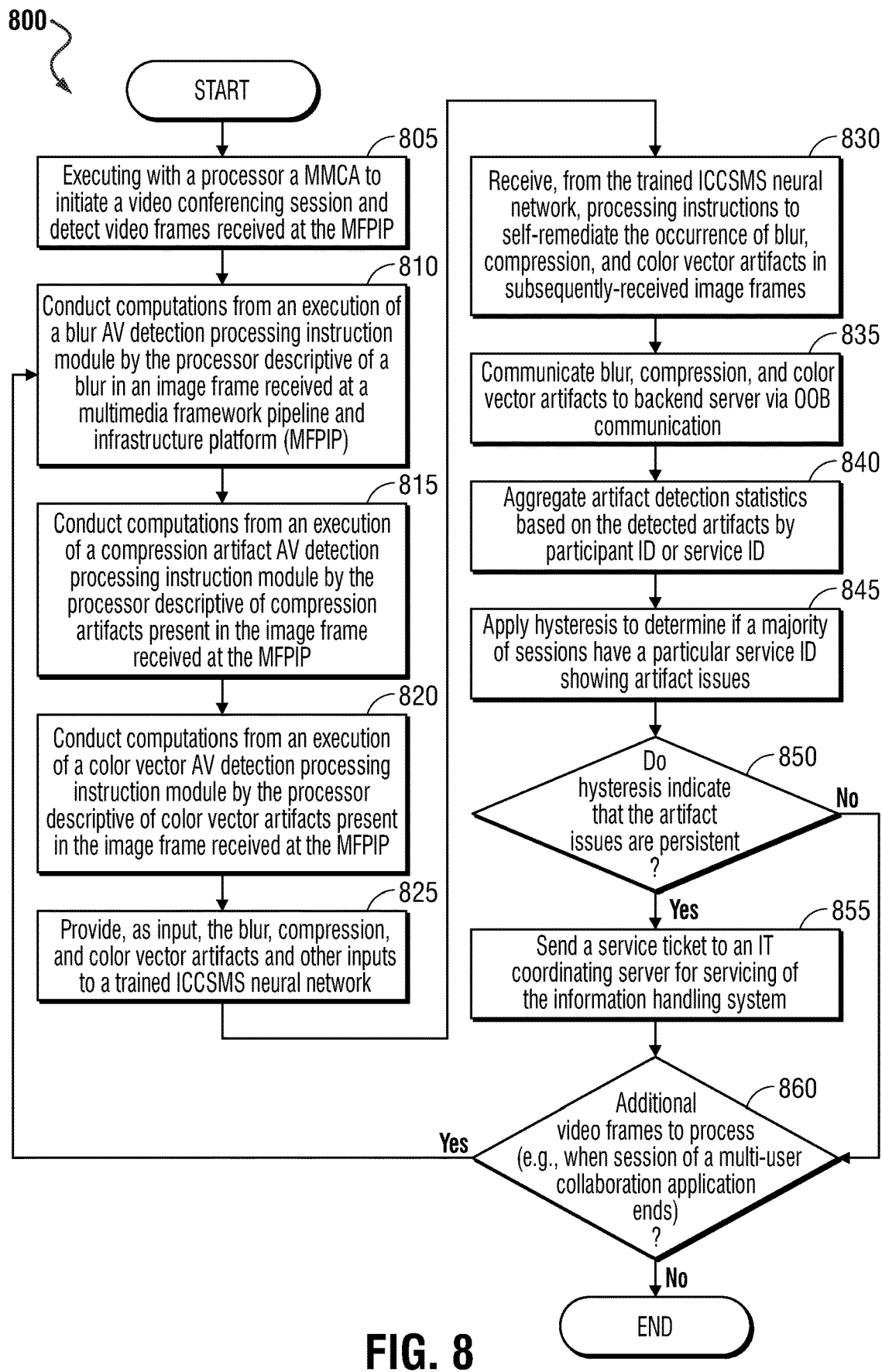
FIG. 8 is a flow diagram illustrating a method of monitoring and remediating for AV artifacts within video frames received at and to be sent by an information handling system.

FIG. 8 is a flow diagram illustrating a method of monitoring and remediating for AV artifacts within video frames received at or to be sent by an information handling system. The method 800 may begin with executing, with a processor, a MMCA to initiate a video conferencing session and detect video frames received at the MFPIP at block 805. As described herein, the execution of the MMCA causes a video camera of the information handling system to capture individual video frames and present those video frames to the MFPIP for further processing. This causes the streaming media device driver and MPCAPI to provide a stream of video frames to the MFPIP. The streaming video captured by the camera of the information handling system may be processed to be sent, over a network, to a remote information handling system to provide video and audio data during the video conferencing session. Other streaming video may be received from a remote source information handling system and processed for display at the information handling system during the video conference session.

The method 800 may further include, at block 810, conducting computations from an execution of a blur AV detection processing instruction module by the processor descriptive of a blur in an image frame received at a the MFPIP. In this embodiment, the execution of the blur AV detection processing instruction module 381 as described, for example, in FIG. 3 may cause the MFPIP 338 to compute to detect the existence of or a level of blur within any video frame as described herein. In an embodiment, if a level of blur is detected, this data may be presented to the trained ICCSMS neural network as input at any time during the method along with any other types of input. In an embodiment, if a threshold level of blur is detected then the data is provided to the trained ICCSMS neural network as input. Where the threshold level of blur is not met, no data descriptive of the blur is sent to the trained ICCSMS neural network.

The method 800 may also include, at block 815, conducting computations from an execution of a compression artifact AV detection processing instruction module by the processor descriptive of compression artifacts present in the image frame received at the MFPIP. The compression artifact AV detection processing instruction module 382, as described in connection with FIG. 3, may be computer executable instructions that, when executed by a processor of the information handling system, computes a level of compression artifacts that exist in the video frames. In an embodiment, the transmission of video frames across the network may involve the compression and decompression of videos sent from one information handling system to another information handling system during the execution of the MMCA. During this time, certain compression and decompression algorithms may create compression artifacts that may alter the appearance of any of the video frames such as a blockiness of the video frame image due to lost image data. In this embodiment, if a level of compression artifacts or blockiness is detected in the video conference, such data may be presented to the trained ICCSMS neural network as input along with any other types of input. In an embodiment, if a threshold level of compression artifacts is detected, then the data is provided to the trained ICCSMS neural network as input. Where the threshold level of compression artifacts is not met, no data descriptive of the compression artifacts is sent to the trained ICCSMS neural network.

The method 800 may also include conducting computations from an execution of a color vector AV detection processing instruction module by the processor descriptive of color vector artifacts present in the image frame received at the MFPIP at block 820. The color vector AV detection processing instruction module 383 may be computer executable instructions that, when executed by a processor of the information handling system, computes a level of color vector artifacts that exist in the video frames as described in connection with FIG. 3. In an embodiment, the transmission of video frames using the compression and decompression processes of videos may cause some color vectors within the image frame to be changed or distorted. In this embodiment, if a level of color vector artifacts is detected, such data may be presented to the trained ICCSMS neural network as input along with any other types of input. In an embodiment, if a threshold level of color vector artifacts is detected, then the data is provided to the trained ICCSMS neural network as input. Where the threshold level of color vector artifacts is not met, no data descriptive of the color vector artifacts is sent to the trained ICCSMS neural network.

The method may further include providing as input, the blur, compression, and color vector artifacts indication data to the trained ICCSMS neural network at block 825. In an embodiment, other input data may also be sent to the trained ICCSMS neural network and that other data such as a level of processing resources consumed during the operation of the MMCA, bandwidth consumed during the operation of the MMCA, camera resolution, computer resources consumed via the execution of a specific encoding/decoding algorithm used to compress and decompress the video frames, as well as default media capture instructions and default AV processing instructions. The neural network may be trained in an embodiment to model the relationship between performance of the MMCA and all inputs received at the trained ICCSMS neural network including indications of blur, compression, or color vector artifacts. The trained ICCSMS neural network may input each of the values gathered from the multimedia processing control API and the MMCA, in an embodiment, into a trained multi-layered, feed-forward, machine-learning neural network to determine the relationship between one or more of the input values transmitted and one or more performance metrics represented by the meeting metrics gathered, and the presence of one or more artifacts in the streaming video data. For example, the neural network may correlate media capture settings, AV detection processing instructions (e.g., via execution of one or more AV detection processing instruction modules indicating levels of blur, compression, or color vector artifacts), or offload settings with certain meeting metrics for a user session. Such meeting metrics may include the CPU or other processor resource load consumed by the multimedia multi-user collaboration application during a user session, or latency, jitter, or packet loss as measured by the MMCA during a user session, or any other meeting metrics described herein.

As such, at block 830, the method 800 includes receiving from the trained ICCSMS neural network, output of optimized processing instructions to self-remediate the occurrence of blur, compression, and color vector artifacts in subsequently-received image frames among other processing instructions in an embodiment. As described, these processing instructions may include computer executable instructions that direct the information handling system to change the operation parameters in order to decrease, at least, the blur compression, and color vectors artifacts presented in the image frames. For example, where a blur is detected and the data is provided to the trained ICCSMS neural network, self-remediation processes may include optimized media capture instruction adjustments. The trained ICCSMS neural network may also output optimized media capture instruction adjustments to adjust the video capture characteristics of a camera used, aspect ratio of images captured by the camera, resolution of images captured, among other AV processing instruction adjustments to provide the streaming video data to the MFPIP, adjust encoding or decoding algorithms (e.g., lossy compression algorithms) used to compress and decompress, respectively, the video frames during the streaming video conference session. among other remediation processes. Additionally, as other input is received at the trained ICCSMS neural network, the applicable self-remediation processing instructions may be applied to the information handling system such as optimized processor offload instruction adjustments to change processing resource allocations (e.g., offloading) by invoking other alternative processors (e.g., GPU, VPU, GNA, etc.).

The method 800 may further include, at block 835, the trained ICCSMS may communicate the blur, compression, and color vector artifacts to a backend server via an out-of-band (OOB) communication including assessment of potential causes or potential remedies. For example, the trained ICCSMS neural network may generate an instruction to issue an IT ticket or instructions to a central ICCSMS to execute remedies at one or more information handling systems participating in the videoconference sessions. This OOB communication may be any communication over a network that is separate from the communications conducted to facilitate the operations of the video conferencing session. The backend sever may then aggregate artifacts detection statistics based on the detected artifacts by participant ID or service ID at block 840 of the method 800. The aggregation of the data may be specific to each of the information handling systems and identifies the processes conducted to remediate the blur, compression, and color vector artifacts experienced at the information handling system as well as the level of these artifacts computed at blocks 810-820.

At block 845, the backend server may apply hysteresis to determine if a majority of video conferencing sessions have a particular service ID showing a specific level of artifact issues. In an embodiment, this level of artifact issues reached may be determined by setting a threshold limit that, when exceeded, indicates to the backend server that the level of artifacts experienced are persistent. Here, the backend server may make the determination as to whether the hysteresis indicate that the artifact issues experienced at the information handling system are persistent at block 850. Where backend server determines that the threshold level of experienced artifact issues has been met, the method 800 includes sending a service ticket to an IT coordinating server for servicing of the information handling system or a plurality of information handling systems each as coordinating encoding/decoding used or other aspects of streamed video frames between managed information handling systems to reduce artifacts. Alternatively, the remediation optimized processing instructions from the trained ICCSMS neural network may be transmitted to a centralized ICCSMS for distribution of adjustments to one or more managed information handling systems participating in a videoconference via the MMCA. As described herein, the self-remediation processes conducted by the information handling system itself may resolve certain blur, compression, and color vector artifact issues. However, a persistent occurrence of these issues may indicate issues associated with hardware, or software, or communication issues effecting the participant information handling system. In this embodiment, an IT manager may be made aware at the IT coordinating server that such hardware or software issues may need to be addressed at one or more managed information handling systems.

Whether the hysteresis indicated that the artifact issues are persistent or not, the method 800 may continue with determining whether additional video frames are to be processed at block 860. When no more video frames are being processed, this may indicate that the video conferencing session has been terminated at the MMCA. Where more video frames are to be analyzed per the method 800 described herein, the method 800 may proceed to block 810 and conduct those processes described herein. Where no additional video frames are to be analyzed at block 860, the method 800 may end.

Figure 9:
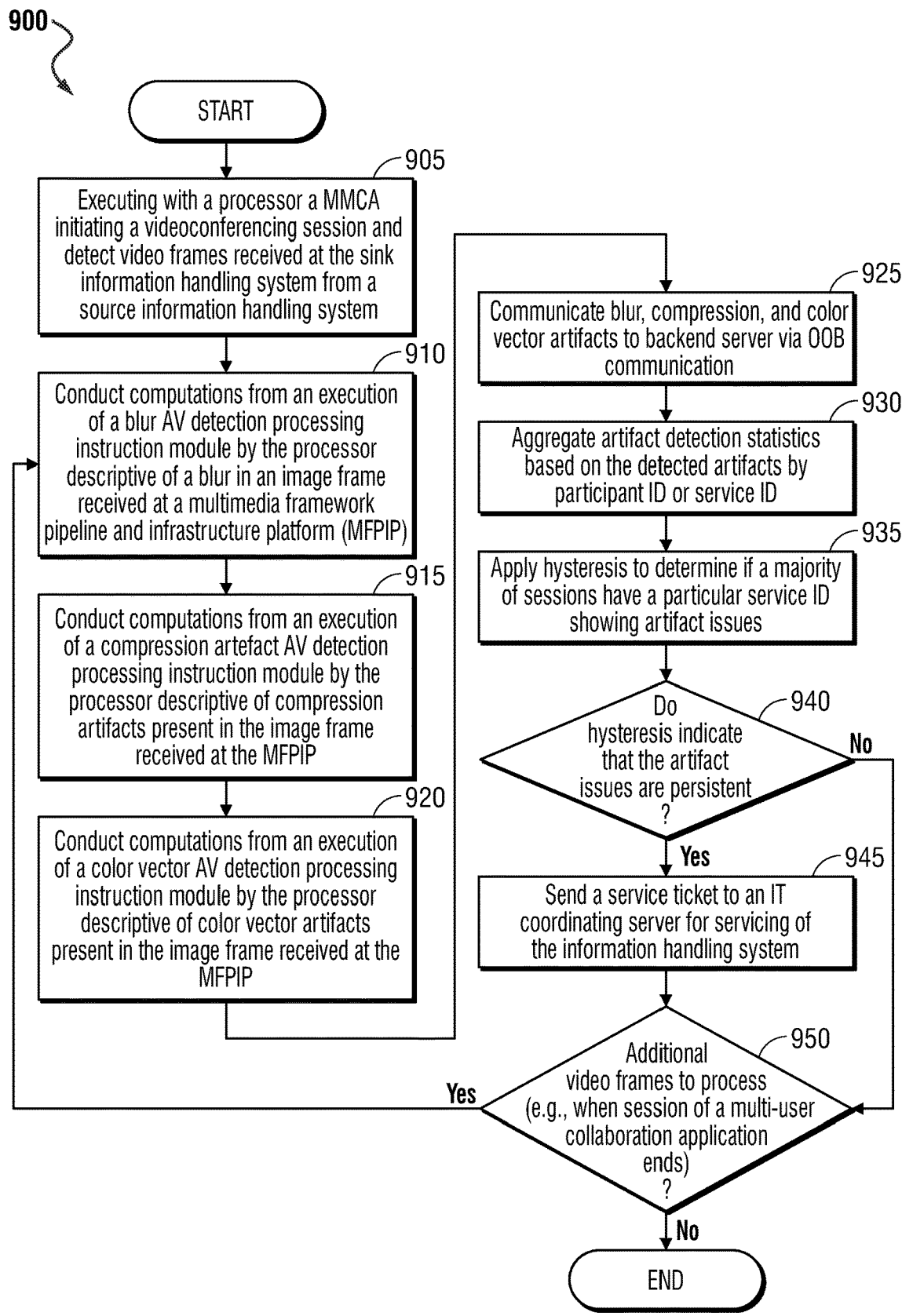
FIG. 9 is a flow diagram illustrating a method of monitoring and remediating for AV artifacts within video frames received from a source information handling system at a sink information handling system.

FIG. 9 is a flow diagram illustrating a method 900 of monitoring and remediating for AV artifacts within video frames received from a remote source information handling system at a sink information handling system. The method 900 may begin with executing, with a processor, an MMCA initiating a videoconferencing session and detecting video frames received at the sink information handling system from a source information handling system at block 905. As described herein, the execution of the MMCA causes a video camera of all information handling systems engaged in the video conferencing session to capture individual video frames and present those video frames to other information handling systems over a network. This causes the streaming media device driver and MPCAPI of each information handling system to provide a stream of video frames to the information handling system described in connection with the operation of the method 900. The streaming video received at the information handling system may be at the MFPIP of the information handling system to provide video and audio data during the video conferencing session to the user operating the information handling system.

The method 900 may further include, at block 910, conducting computations from an execution of a blur AV detection processing instruction module by the processor generating indication data descriptive of a blur in an image frame received at a the MFPIP. In this embodiment, the execution of the blur AV detection processing instruction module 381 as described, for example, in FIG. 3 may cause the MFPIP 338 to compute a level of blur within any video frame. In an embodiment, if a level of blur is detected, this data may be presented to the trained ICCSMS neural network as input at any time during the method along with any other types of input. In an embodiment, if a threshold level of blur is detected then the data is provided to the trained ICCSMS neural network as input. Where the threshold level of blur is not met, no data descriptive of the blur is sent to the trained ICCSMS neural network.

The method 900 may also include, at block 815, conducting computations from an execution of a compression artifact AV detection processing instruction module by the processor descriptive of compression artifacts present in the image frame received at the MFPIP. The compression artifact AV detection processing instruction module 382, as described in connection with FIG. 3, may be computer executable instructions that, when executed by a processor of the information handling system, computes a level of compression artifacts that exist in the video frames such as blockiness of the video frames. In an embodiment, the transmission of video frames across the network may involve the compression and decompression of videos sent from one information handling system to another information handling system during the execution of the MMCA. During this time, certain compression and decompression algorithms may create compression artifacts that may alter the appearance of any of the video frames. In this embodiment, if a level of compression artifacts such as blockiness in the image frame is detected, such data may be presented to the trained ICCSMS neural network as input along with any other types of input. In an embodiment, if a threshold level of compression artifacts is detected, then the data is provided to the trained ICCSMS neural network as input. Where the threshold level of compression artifacts is not met, no data descriptive of the compression artifacts is sent to the trained ICCSMS neural network.

The method 900 may also include conducting computations from an execution of a color vector AV detection processing instruction module by the processor descriptive of color vector artifacts present in the image frame received at the MFPIP at block 920. The color vector AV detection processing instruction module 383 may be computer executable instructions that, when executed by a processor of the information handling system, computes a level of color vector artifacts that exist in the video frames as described in connection with FIG. 3. In an embodiment, the transmission of video frames using the compression and decompression processes of videos may cause some color vectors within the image frame to be changed or distorted. In this embodiment, if a level of color vector artifacts is detected, such data may be presented to the trained ICCSMS neural network as input along with any other types of input. In an embodiment, if a threshold level of color vector artifacts is detected, then the data is provided to the trained ICCSMS neural network as input. Where the threshold level of color vector artifacts is not met, no data descriptive of the color vector artifacts is sent to the trained ICCSMS neural network.

The method 900 may proceed to block 925 with an output from the trained ICCSMS neural network as generating a communication of the blur, compression, and color vector artifact to a backend server via an OOB communication and potential causes of the determined artifacts. The backend sever may then aggregate artifacts detection statistics based on the detected artifacts by participant ID or service ID at block 930 of the method 900. The aggregation of the data may be specific to each of the information handling systems and identifies the processes conducted to remediate the blur, compression, and color vector artifacts experienced at the information handling system as well as the level of these artifacts computed at blocks 910-920.

At block 935, the backend server may apply hysteresis to determine if a majority of video conferencing sessions have a particular service ID showing a specific level of artifact issues. In an embodiment, this level of artifact issues reached may be determined by setting a threshold limit that, when exceeded, indicates to the backend server that the level of artifacts experienced are persistent. Here, the backend server may make the determination as to whether the hysteresis indicate that the artifact issues experienced at the information handling system are persistent at block 940. Where backend server determines that the threshold level of experienced artifact issues has been met, the method 900 includes sending a service ticket to an IT coordinating server for servicing of one or more managed information handling systems at block 945. As described herein, the self-remediation processes conducted by the source information handling systems themselves may resolve certain blur, compression, and color vector artifact issues at those remote information handling systems or vice versa. However, a persistent occurrence of these issues may indicate issues associated with hardware or software issues at those source and remote information handling systems that may require coordinated adjustments to media capture settings, AV processing information module algorithms, or communications. This indicates to the local information handling system and the backend server that the video frames sent to the local information handling system have persistent blur, compression, and/or color vector issues that should be addressed by an IT manager or via a central ICCSMS distributing remediating optimized processing instructions output from the trained ICCSMS neural network at the source information handling system to benefit the sink information handling system or vice versa. In this embodiment, an IT manager may be made aware at the IT coordinating server that such hardware or software issues at the remote information handling system may need to be addressed for example in an embodiment. In an embodiment, these IT service tickets may be sent to a software agent which manages support for IT service tickets, such as Dell® SupportAssist®, to provide a control panel for system tools and diagnostics. With SupportAssist® the IT service ticket may be addressed and any number of warnings to those users engaged in the video conferencing session as well to any IT support staff may be sent out to elicit hardware or software changes at their respective information handling systems.

Whether the hysteresis indicated that the artifact issues are persistent or not, the method 900 at the local information handling system may continue with determining whether additional video frames are to be processed at block 950. When no more video frames are being processed, this may indicate that the video conferencing session has been terminated at the MMCA. Where more video frames are to be analyzed per the method 900 described herein, the method 900 may proceed to block 910 and conduct those processes described herein. Where no additional video frames are to be analyzed at block 950, the method 900 may end.

The blocks of the flow diagrams of FIGS. 7, 8, and 9, or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing a multimedia multi-user collaboration application (MMCA), comprising:
    a memory;
    a power management unit;
    a camera to capture video of a user participating in a video conference session;
    a processor configured to execute code instructions of a trained intelligent collaboration contextual session management system (ICCSMS) neural network to receive as input:
        computations from an execution of a blur AV detection processing instruction module by the processor descriptive of a blur in an image frame received at a multimedia framework pipeline and infrastructure platform (MFPIP);
        computations from an execution of a compression artifact AV detection processing instruction module by the processor descriptive of compression artifacts present in the image frame received at the MFPIP; and
        computations from an execution of a color vector AV detection processing instruction module by the processor descriptive of color vector artifacts present in the image frame received at the MFPIP;
    the trained ICCSMS to provide, as output, processing instructions to remediate the occurrence of blur, compression, and color vector artifacts in one or more image frames; and
    the trained ICCSMS to provide, as output, processing instructions to create a service ticket to be sent to an information technology (IT) coordinating server when a threshold number of video conference sessions engaged in by the information handling system experience the occurrence of blur, compression, and color vector artifacts.

2. The information handling system of claim 1 further comprising:
    a network interface device configured to transmit the blur in the image frame, the compression artifacts present in the image frame, or the color vector artifacts present in the image frame to a backend server via an out-of-band communication to aggregate detected artifacts for the videoconferencing session.

3. The information handling system of claim 1 further comprising:
a color sensor to detect color vector data in the video frame and provide the color vector data to the color vector AV detection processing instruction module to compute color vector artifacts present in the image frame received at the MFPIP.

4. The information handling system of claim 1 further comprising:
a fast Fourier transform of the blur AV detection processing instruction module to determine a threshold level of blur present in the video frame.

5. The information handling system of claim 1 further comprising:
an AV processing instruction manager to chain together the blur AV detection processing instruction module, the compression artifact AV detection processing instruction module, and the color vector AV detection processing instruction module to successively apply and reapply the blur AV detection processing instruction module, the compression artifact AV detection processing instruction module, and the color vector AV detection processing instruction module to the video frame.

6. The information handling system of claim 1 further comprising:
the processing instructions to remediate the occurrence of blur, compression, and color vector artifacts in the one or more image frames including processing instructions to adjust an image resolution captured by the camera.

7. The information handling system of claim 1, further comprising:
the processing instructions to remediate the occurrence of blur, compression, and color vector artifacts in the one or more image frames including processing instructions to adjust encryption/decryption parameters used to encrypt/decrypt the video frame.

8. The information handling system of claim 1, the trained ICCSMS neural network being executed on a backend server remote from the information handling system.

9. A method of monitoring and remediating for AV artifacts at an information handling system, comprising:
with a processor, executing a multimedia multi-user collaboration application (MMCA), initiating a videoconferencing session;
determining whether a video frame received at a multimedia framework pipeline and infrastructure platform (MFPIP) is received at or to be sent from the information handling system during the video conferencing session;
executing code instructions of a trained intelligent collaboration contextual session management system (ICCSMS) neural network to receive as input:
computations from an execution of a blur AV detection processing instruction module by the processor descriptive of a blur in an image frame received at a multimedia framework pipeline and infrastructure platform (MFPIP);
computations from an execution of a compression artifact AV detection processing instruction module by the processor descriptive of compression artifacts present in the image frame received at the MFPIP; and
computations from an execution of a color vector AV detection processing instruction module by the processor descriptive of color vector artifacts present in the image frame received at the MFPIP;
providing processing instructions, as output from the trained ICCSMS, to remediate the occurrence of blur, compression, and color vector artifacts in one or more image frames; and
providing, as output from the trained ICCSMS, processing instructions to create a service ticket to be sent to an information technology (IT) coordinating server when a threshold number of video conference sessions engaged in by the information handling system experience the occurrence of blur, compression, and color vector artifacts.

10. The method of claim 9, further comprising:
transmitting, via a network interface device, the blur in the image frame, the compression artifacts present in the image frame, or the color vector artifacts present in the image frame to a backend server via an out-of-band communication to aggregate detected artifacts by a participant identification in the videoconferencing session.

11. The method of claim 9, further comprising:
detecting, with a color sensor, color vector data in the video frame and provide the color vector data to the color vector AV detection processing instruction module to compute color vector artifacts present in the image frame received at the MFPIP.

12. The method of claim 9, further comprising:
with a fast Fourier transform of the blur AV detection processing instruction module, determining a threshold level of blur present in the video frame.

13. The method of claim 9 further comprising:
with an AV processing instruction manager, chaining together the blur AV detection processing instruction module, the compression artifact AV detection processing instruction module, and the color vector AV detection processing instruction module to successively apply and reapply the blur AV detection processing instruction module, the compression artifact AV detection processing instruction module, and the color vector AV detection processing instruction module to the video frame.

14. The method of claim 9 further comprising:
the processing instructions to remediate the occurrence of blur, compression, and color vector artifacts in the one or more image frames including processing instructions to adjust an image resolution captured by the camera.

15. An information handling system executing an intelligent collaboration contextual session management system (ICCSMS), comprising:
a memory;
a power management unit;
a camera to capture video of a user participating in a video conference session;
a processor to execute a multimedia multi-user collaboration application (MMCA) to engage a user in a videoconferencing session;
a multimedia framework pipeline and infrastructure platform (MFPIP) to provide, as input to the ICCSMS:
computations from an execution of a blur AV detection processing instruction module by the processor descriptive of a blur in an image frame received at a multimedia framework pipeline and infrastructure platform (MFPIP);

computations from an execution of a compression artifact AV detection processing instruction module by the processor descriptive of compression artifacts present in the image frame received at the MFPIP; and computations from an execution of a color vector AV detection processing instruction module by the processor descriptive of color vector artifacts present in the image frame received at the MFPIP;

the trained ICCSMS to provide, as output, processing instructions to remediate the occurrence of blur, compression, and color vector artifacts in one or more image frames; and an AV processing instruction manager to chain together the blur AV detection processing instruction module, the compression artifact AV detection processing instruction module, and the color vector AV detection processing instruction module to successively apply and reapply the blur AV detection processing instruction module, the compression artifact AV detection processing instruction module, and the color vector AV detection processing instruction module to the video frame.

16. The information handling system of claim 15 further comprising:

the trained ICCSMS to provide, as output, processing instructions to create a service ticket to be sent to an information technology (IT) coordinating server;

the processing instructions to create a service ticket to be sent to the IT coordinating server when a threshold number of video conference sessions engaged in by the information handling system experience the occurrence of blur, compression, and color vector artifacts.

17. The information handling system of claim 15 further comprising:

a network interface device to transmit the blur in the image frame, the compression artifacts present in the image frame, or the color vector artifacts present in the image frame to a backend server via an out-of-band communication to aggregate detected artifacts by a participant identification in the videoconferencing session.

18. The information handling system of claim 15 further comprising:

the processing instructions to remediate the occurrence of blur, compression, and color vector artifacts in the one or more image frames including processing instructions to adjust an image resolution captured by the camera.

19. The information handling system of claim 15 further comprising:

the processing instructions to remediate the occurrence of blur, compression, and color vector artifacts in the one or more image frames including processing instructions to adjust encryption/decryption parameters used to encrypt/decrypt the video frame.

20. The information handling system of claim 15, further comprising:

a color sensor to detect color vector data in the video frame and provide the color vector data to the color vector AV detection processing instruction module to compute color vector artifacts present in the image frame received at the MFPIP.

* * * * *